US011953665B2

(12) United States Patent
Fuse et al.

(10) Patent No.: US 11,953,665 B2
(45) Date of Patent: Apr. 9, 2024

(54) IMAGING APPARATUS AND MANUFACTURING METHOD OF IMAGING APPARATUS

(71) Applicant: CANON KABUSHIKI KAISHA, Tokyo (JP)

(72) Inventors: Naoto Fuse, Kawagoe (JP); Chiaki Inoue, Utsunomiya (JP); Ichiro Kanazashi, Tokyo (JP); Atsushi Takata, Yokohama (JP); Kazuhiro Kochi, Yokohama (JP); Kouga Okada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 832 days.

(21) Appl. No.: 17/035,992

(22) Filed: Sep. 29, 2020

(65) Prior Publication Data

US 2021/0026120 A1  Jan. 28, 2021

Related U.S. Application Data

(63) Continuation of application No. PCT/JP2019/011482, filed on Mar. 19, 2019.

(30) Foreign Application Priority Data

Apr. 3, 2018  (JP) ................................. 2018-071406
Jan. 10, 2019  (JP) ................................. 2019-002763

(51) Int. Cl.
*G02B 17/06*       (2006.01)
*B60R 11/04*       (2006.01)
(Continued)

(52) U.S. Cl.
CPC .......... *G02B 17/0657* (2013.01); *B60R 11/04* (2013.01); *G02B 7/182* (2013.01); *G03B 35/08* (2013.01); *B60R 2011/0026* (2013.01)

(58) Field of Classification Search
CPC ..... G02B 17/0657; G02B 7/182; B60R 11/04; G03B 35/08
See application file for complete search history.

(56) References Cited

U.S. PATENT DOCUMENTS 7,016,124 B2   3/2006   Hatakeyama et al.
7,031,059 B1   4/2006   Costes
(Continued)

FOREIGN PATENT DOCUMENTS

JP   H09-005650 A   1/1997
JP   H10-123422 A   5/1998
(Continued)

OTHER PUBLICATIONS

JP 2005-0024695 A, US 2004/0264006 A1 U.S. Pat. No. 7,016,124 B2, JP 2005-0024695A, US 2004/0264006 A1, U.S. Pat. No. 7,016,124 B2 were cited in Sep. 29, 2020 IDS.
(Continued)

*Primary Examiner* — Ryan D Howard
(74) *Attorney, Agent, or Firm* — Venable LLP

(57) ABSTRACT

An imaging apparatus includes a first reflection optical system and a second reflection optical system having mutually different optical axes, each of the first and second reflection optical systems includes a plurality of reflecting surfaces, a first imaging portion configured to receive an imaging light reflected by the first reflection optical system, a second imaging portion configured to receive an imaging light reflected by the second reflection optical system, a first member, a second member, and a frame. A part of the plurality of reflecting surfaces of the first reflection optical system are reflecting surfaces provided on the frame. Among the plurality of reflecting surfaces of the first reflection optical system, a final-stage reflecting surface configured to reflect the imaging light toward the first imaging portion is (Continued)

a first reflecting surface formed on a surface of the first member.

24 Claims, 12 Drawing Sheets

(51) Int. Cl.
    *G02B 7/182* (2021.01)
    *G03B 35/08* (2021.01)
    *B60R 11/00* (2006.01)

(56) References Cited

U.S. PATENT DOCUMENTS

| | | |
|---|---|---|
| 7,689,116 B2 | 3/2010 | You et al. |
| 2003/0214712 A1* | 11/2003 | Yano .................... G02B 13/06 348/E13.064 |
| 2004/0264006 A1 | 12/2004 | Hatakeyama et al. |
| 2007/0036537 A1 | 2/2007 | You et al. |

FOREIGN PATENT DOCUMENTS

| | | |
|---|---|---|
| JP | 2000-023199 A | 1/2000 |
| JP | 2003-524797 A | 8/2003 |
| JP | 2005-024695 A | 1/2005 |
| JP | 2007-047792 A | 2/2007 |
| JP | 2017-044722 A | 3/2017 |

OTHER PUBLICATIONS

JP 2017-044722 A, cited in Sep. 29, 2020 IDS.
JP H10-123422 A, cited in Sep. 29, 2020 IDS.
JP 2003-524797 A, U.S. Pat. No. 7,031,059 B1, JP 2003-524797 A and U.S. Pat. No. 7,031,059 B1 were cited in Sep. 29, 2020 IDS.
JP 2007-047792 A, US 2007/0036537 A1, U.S. Pat. No. 7,689,116, JP 2007-044792 A, US 2007/0036537 A1, and U.S. Pat. No. 7,689,116 B2 were cited in Sep. 29, 2020 IDS.
Jun. 25, 2019 International Search Report in International Patent Appln. No. PCT/JP2019/011482.
Feb. 28, 2023 Japanese Official Action in Japanese Patent Appln. No. 2019-002763.

* cited by examiner

IMAGING APPARATUS AND MANUFACTURING METHOD OF IMAGING APPARATUS

CROSS-REFERENCE TO RELATED APPLICATIONS

This application is a continuation of International Patent Application No. PCT/JP2019/011482, filed Mar. 19, 2019, which claims the benefit of Japanese Patent Application No. 2018-071406, filed Apr. 3, 2018, and Japanese Patent Application No. 2019-002763, filed Jan. 10, 2019, which are hereby incorporated by reference herein their entirety.

BACKGROUND OF THE INVENTION

Field of the Invention

The present invention relates to an imaging apparatus that includes an imaging device for receiving light sequentially reflected by a plurality of reflection optical elements, and a manufacturing method of the imaging apparatus.

Description of the Related Art

In a wide-angle lens used for an imaging apparatus, such as a surveillance camera or a camera mounted on a moving body such as a vehicle mounted camera, there are demands for a small, light-weight and relatively inexpensive configuration in which a wide field of view can be ensured. If a dioptric system is used as an imaging optical system, a configuration is known where a two-group configuration or other various optical systems including as small a number of lenses in the configuration as possible, are combined with the imaging device.

An apparatus that uses a reflection optical system instead of a dioptric system is proposed, as taught in Japanese Patent Application Laid-Open Publication Nos. H09-5650 and 2005-24695. In comparison to the dioptric system, if a reflection optical system is used for an imaging optical system, there is a merit in that an optical system that has no chromatic aberration and that is capable of coping with lights from visible light to infrared light using a common optical system with sufficient correction of aberration can be configured.

An imaging apparatus using such a reflection optical system as mentioned above includes an imaging device that receives imaging light that has been reflected sequentially by a plurality of reflection optical elements such as mirrors. Normally, in such a configuration, incident and reflection, i.e., emission, directions of imaging light on the reflection optical elements are not linearly aligned as in the dioptric system using a lens. This type of optical system, especially the reflection optical system that includes an optical path of a reference wavelength serving as a reference axis that reaches an image surface from an object surface and a curved surface serving as an off-axial curved surface that is not a plane surface and whose plane normal of the reflecting surface does not correspond to the reference axis, is called an off-axial optical system.

In comparison to the dioptric system, relatively easy design and manufacture of optical devices is enabled in the reflection optical system, but on the other hand, the reflection optical system is often very sensitive to manufacturing errors, such as profile irregularity and eccentricity, due to the complexity of optical axis arrangement described above. For example, it was extremely time-consuming to remove all errors of the plurality of reflecting surfaces of the reflection optical system constituting the imaging optical system by mechanical adjustment during manufacture of the imaging apparatus, and there was a drawback in that problems tended to occur both technically and economically.

SUMMARY OF THE INVENTION

According to a first aspect of the present invention, an imaging apparatus includes a first reflection optical system and a second reflection optical system having mutually different optical axes, each of the first and second reflection optical systems including a plurality of reflecting surfaces, a first imaging portion configured to receive an imaging light reflected by the first reflection optical system, a second imaging portion configured to receive an imaging light reflected by the second reflection optical system, a first member, a second member, and a frame. A part of the plurality of reflecting surfaces of the first reflection optical system and a part of the plurality of reflecting surfaces of the second reflection optical system are reflecting surfaces provided on the frame. Among the plurality of reflecting surfaces of the first reflection optical system, a final-stage reflecting surface configured to reflect the imaging light toward the first imaging portion is a first reflecting surface formed on a surface of the first member. Among the plurality of reflecting surfaces of the second reflection optical system, a final-stage reflecting surface configured to reflect the imaging light toward the second imaging portion is a second reflecting surface formed on a surface of the second member.

According to a second aspect of the present invention, a manufacturing method of an imaging apparatus including a first reflection optical system and a second reflection optical system having mutually different optical axes, each of the first and second reflection optical systems including a plurality of reflecting surfaces, a first imaging portion configured to receive an imaging light reflected by the first reflection optical system, a second imaging portion configured to receive an imaging light reflected by the second reflection optical system, and a frame, the manufacturing method includes forming a first reflecting surface serving as a final-stage reflecting surface configured to reflect the imaging light toward the first imaging portion in the first reflection optical system on a surface of a first member separate from the frame, forming a second reflecting surface serving as a final-stage reflecting surface configured to reflect the imaging light toward the second imaging portion in the second reflection optical system on a surface of a second member separate from the frame, forming a reflecting surface that differs from the first reflecting surface among the plurality of reflecting surfaces of the first reflection optical system and a reflecting surface that differs from the second reflecting surface among the plurality of reflecting surfaces of the second reflection optical system on the frame, adjusting a position and orientation of the first member with respect to the frame while monitoring a state of arrival of the imaging light to the first imaging portion, and fixing the first member to the frame at an adjusted position, and adjusting a position and orientation of the second member with respect to the frame while monitoring a state of arrival of the imaging light to the second imaging portion, and fixing the second member to the frame at an adjusted position.

Further features of the present invention will become apparent from the following description of exemplary embodiments with reference to the attached drawings.

DESCRIPTION OF THE EMBODIMENTS

First Embodiment

Now, embodiments for carrying out the present invention will be described with reference to the accompanied drawings. The configurations described hereafter are mere examples, and the detailed configurations can be altered arbitrarily by those skilled in the art without deviating from the scope of the present invention.

The following description illustrates a configuration example of an imaging apparatus including mirrors R1 to R6 that serve as a plurality of reflection optical elements provided on a frame and imaging portions (IMG1 and IMG2) that receive imaging light sequentially reflected on these mirrors. In the imaging optical system, an off-axial focusing optical system is composed by the mirrors R1 to R6, without a refractive optical device.

Further, the imaging portion serving as an imaging optical system STU (FIG. 1) according to the present embodiment is composed as an imaging portion of a stereo camera. That is, the imaging portion serving as the imaging optical system STU (FIG. 1) includes a first reflection optical system LO1 and a second reflection optical system LO2 serving as focusing optical systems having different imaging optical axes and each composed of a plurality of mirrors (R1 to R6). The imaging light reflected by the first and second reflection optical systems are respectively captured by imaging devices IMG1 and IMG2 serving as a first imaging portion and a second imaging portion.

Further, an imaging apparatus formed by housing the above-described imaging portion serving as the imaging optical system STU (FIG. 1) in a casing not shown can be designed as an onboard imaging apparatus mounted on a vehicle or other cars. In that case, image data obtained by stereo imaging and other analysis results using an imaging apparatus 100 can be applied to vehicle control and driving support.

Figure 1:
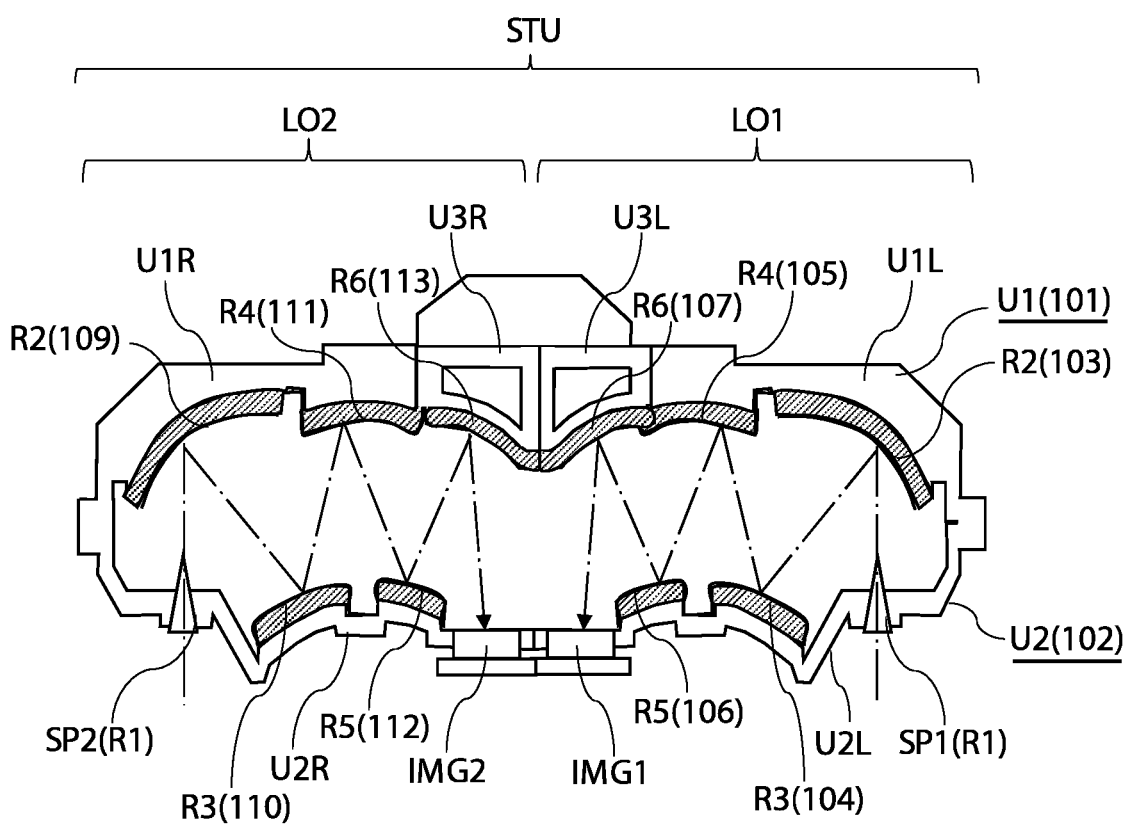
FIG. 1 is a cross-sectional view of an imaging optical system in an imaging apparatus according to a first embodiment of the present invention.
Figure 2:
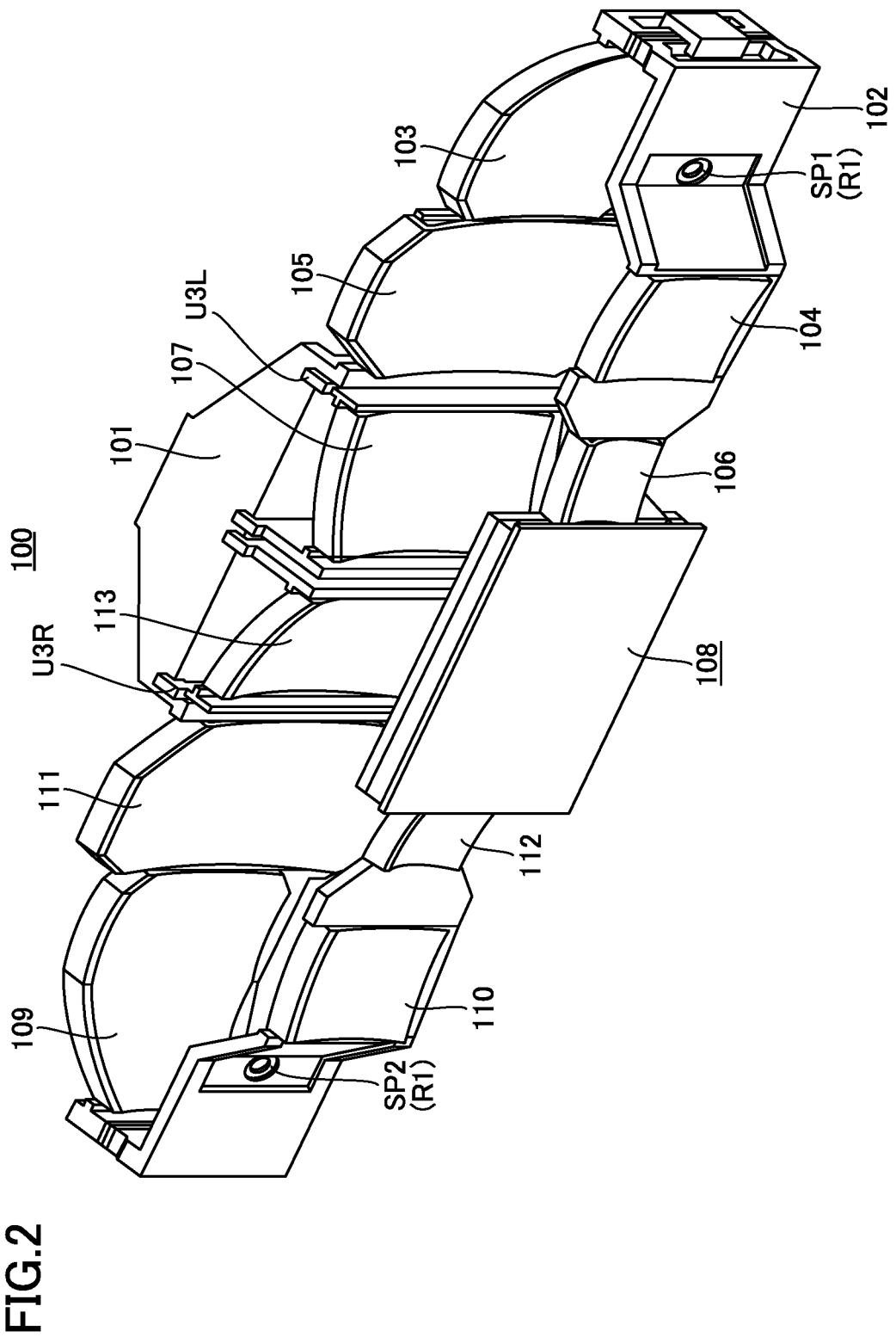
FIG. 2 is a schematic diagram illustrating a main portion of the imaging apparatus of FIG. 1 in perspective from an upper frontward direction.
Figure 3:
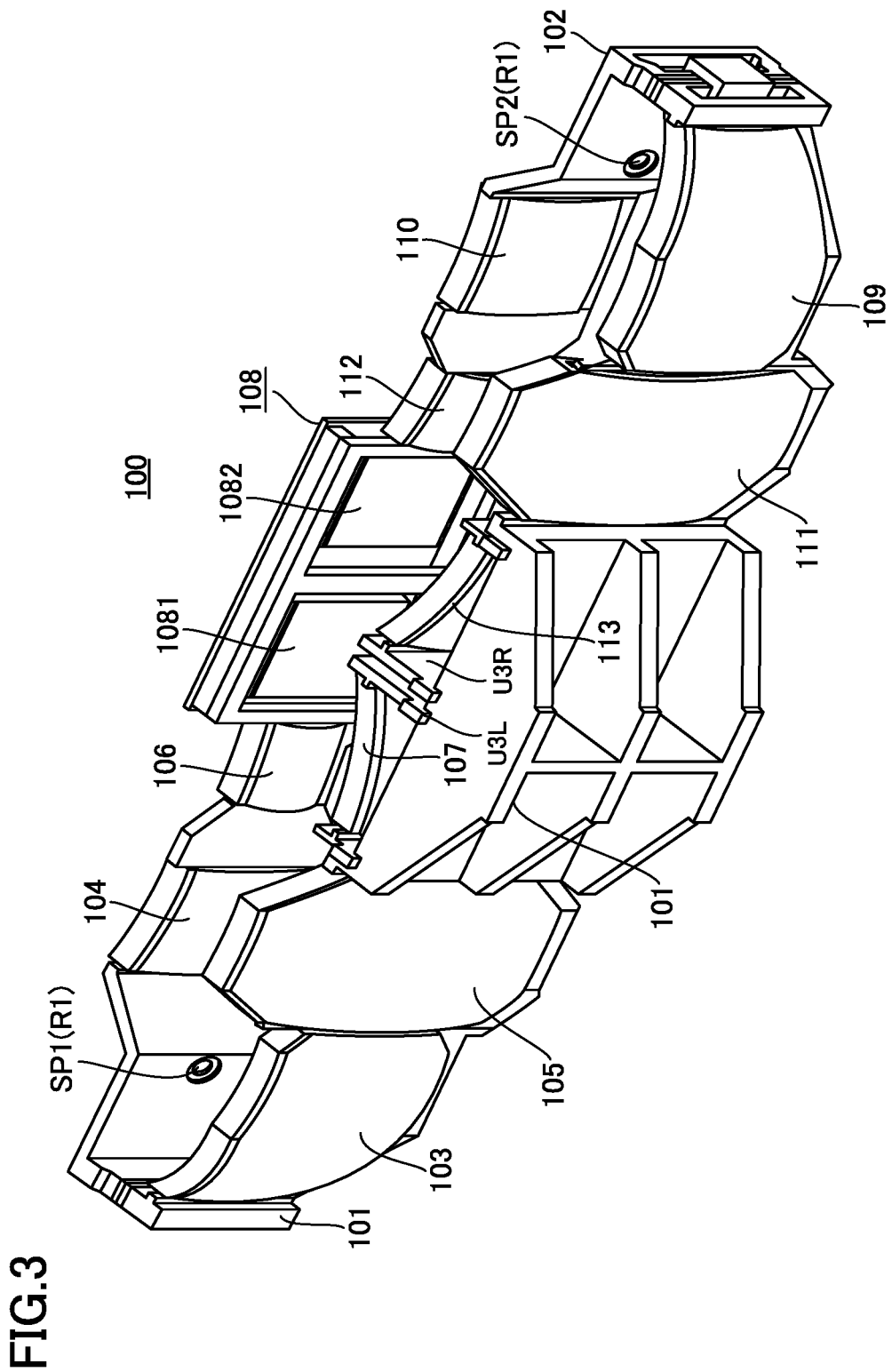
FIG. 3 is a schematic diagram illustrating a main portion of the imaging apparatus of FIG. 1 in perspective from an upper backward direction.

FIG. 1 illustrates a configuration of a transverse section of a focusing optical system adopted in a stereo imaging optical system according to a present embodiment. In the present embodiment, a single ray directed from an object side, that is, photographic subject side, to an image side, that is, image surface side formed on the imaging device, starting from a center of an object surface not shown through a center of a pupil, i.e., aperture, and reaching a center of an image surface is defined as a central principal ray or a reference axis ray. In FIG. 1, this central principal ray or reference axis ray is illustrated by a dashed line. In the following description, a path of the central principal ray or reference axis ray may be simply referred to as a "reference axis". In FIG. 1, references such as SP1, SP2 and R1 to R6 are assigned to optical functional sections. Reference numbers of members corresponding to these sections in FIGS. 2 and 3 are shown in brackets after the references of the respective functional sections. In FIG. 1, opening portions SP1 (R1) and SP2 (R1) are opening portions serving as apertures through which stereo imaging lights from right and left sides become incident, and in this example, they also serve as a diaphragm surface. The opening portions SP1 and SP2 that are spaced apart in right and left directions in the drawing constitute a so-called parallax of a stereo measurement system, the distance between which is sometimes called base line length.

In FIGS. 1, R2 to R6 are mirrors that constitute respective focusing optical systems LO1 and LO2 on right and left sides of a stereo configuration. The reflecting surfaces of the mirrors are as follows: a second surface (R2) is a reflecting surface tilted with respect to the opening portions SP1 (R1) and SP2 (R1), and a third surface (R3), a fourth surface (R4), a fifth surface (R5) and a sixth surface (R6) are reflecting surfaces that are shifted and tilted with respect to the reflecting surface arranged as a former step of each surface. The reflecting surfaces of the respective mirrors from the second surface (R2) to the sixth surface (R6) are formed of metal, glass, plastic and so on. The reflecting surfaces R2 to R6 constituting the second to sixth surfaces are formed by combining concave surfaces and convex surfaces, and the focusing optical systems LO1 and LO2 composed of these reflecting surfaces are configured as a wide-angle system having an angle of view of preferably approximately 60° to 70° or even wider.

The image optical systems LO1 and LO2 of the present embodiment are an off-axial optical system including an optical path having a reference wavelength serving as a reference axis reaching the image surface from the object surface and a curved surface serving as an off-axial curved surface that is not a plane surface and whose plane normal of the reflecting surface does not correspond to the reference axis. In this imaging optical system, the respective reflecting surfaces constituting the focusing optical systems LO1 and LO2 do not have a common optical axis. Therefore, according to the present embodiment, an optical coordinate system is set that has a center position of the opening portions SP1 (R1) and SP2 (R1) set as an origin point. A path of the ray, which is the central principal ray or reference optical axis line, passing through the origin point of the optical coordinate system serving as the center of the opening portions SP1 (R1) and SP2 (R1) and a center position of a final focusing surface, i.e., imaging device surface, is the reference axis. The reference axis has a direction or orientation. The direction of the reference axis is a direction in which the central principal ray or reference axis ray advances toward the image surface.

In the imaging optical system of the present embodiment, the central principal ray or reference axis ray is reflected on the respective reflecting surfaces after passing through a center point or origin of the opening portions SP1 (R1) and SP2 (R1) and reaches a center of a final focusing surface. The order of respective surfaces is set to the order in which the central principal ray or reference axis ray is reflected thereon. The reference axis changes its direction in accordance with the law of reflection along the set order of respective surfaces, and finally reaches the center of the image surface of the imaging devices IMG1 and IMG2. In the present embodiment, the image side or the object side refer to the sides on the reference axis.

In the present example, the reference axis serving as a reference of the focusing optical system is set as above, but the reference axis can be determined arbitrarily, and any convenient setting can be adopted by considering optical design of respective reflecting surface shapes composing the focusing optical system, aberration calculation, convenience of ray tracing and so on. In general, the path of the ray passing the center of the image surface, the aperture or the entrance pupil or the exit pupil, or any one of the opening portions SP1 (R1) and SP2 (R1) of the focusing optical systems LO1 and LO2 or the center of the final surface should be set as the reference axis.

The stereo imaging optical system composed of the focusing optical systems LO1 and LO2 according to the present embodiment is configured based on the following considerations.

Hitherto, a known technique for an optical system to be adopted in a vehicle mounted camera includes two transmission type dioptric systems using lenses arranged horizontally to obtain a stereo image to measure distances or to acquire three-dimensional shape data. Further, various small-sized image optical system of high image quality adopting the focusing optical system including rotationally asymmetric reflecting surfaces are proposed. In order to measure distances highly precisely or to acquire three-dimensional shape data using the stereo imaging optical system, it is necessary to enhance the focusing performance and improve the image quality. Further, if the system is used for the purpose of measuring distances in the vehicle mounted camera, the periphery must be captured widely, so it was necessary to widen the angle of view to a certain extent.

The measurement of distance at night using only the visible light region is difficult due to effects of noises by simply improving sensitivity, so that not only the visible light region but also near infrared light region should preferably be captured. The visible light region refers to a wavelength range of approximately 380 to 700 nm and the near infrared light region refers to a wavelength range of approximately 700 to 1500 nm. In order to handle imaging lights of such wavelength region, it is desirable to adopt a focusing optical system having a relatively bright F-number of approximately F2 to F4 from the viewpoint of diffraction limit.

If a stereo imaging optical system satisfying such conditions is composed of a transmission-type optical lens system, in general, an imaging optical system having a high image quality and bright F-number with a wide angle of view can be achieved by increasing the number of lenses. However, such configuration of the dioptric system has drawbacks in that costs are increased by the significantly increased number of components and manufacturing difficulty is increased by the need to suppress manufacturing errors and assembly errors. Manufacturing costs are also increased to adjust the positions of two optical systems with high precision for realizing stereo imaging.

In contrast, according to the stereo imaging optical system of the present embodiment, the two focusing optical systems each include a plurality of reflecting surfaces and at least one housing member that can be used in common in the two optical systems having reflecting surfaces provided on the surface. Especially, by adopting mirror elements as the reflection optical elements constituting the plurality of reflecting surfaces and further preferably adopting a hollow housing configuration in which a reflecting surface is formed on the inner surface of the housing member, a high focusing performance with a bright F-number can be obtained using a small number of components and without the need to correct chromatic aberration. Since the reflecting surfaces are formed and arranged integrally to the surface of the housing member, deterioration of focusing performance caused by manufacturing errors can be reduced.

The mirror element refers to a mirror structure in which the reflecting surface is coated with a material such as silver or aluminum having a high reflectance in the visible light region and the infrared band, by an arbitrary method such as vapor deposition. In such a mirror element, gaseous medium such as air or vacuum is placed on both the incident-side and the emission-side of the reflecting surface.

In other words, the reflection optical elements of the present embodiment do not adopt a configuration where light is propagated through a transparent solid medium such as a prism and reflected on a wall surface or a boundary with the exterior. The use of an element such as a prism as the reflection optical element may cause chromatic aberration and is therefore not preferable.

According further to the present embodiment, at least one of the plurality of reflecting surfaces constituting the first focusing optical system and at least one of the plurality of reflecting surfaces constituting the second focusing optical system are formed on the surface of a single housing member. By using the single common housing member, it becomes extremely easy to determine the relative positions of the two optical axes of the stereo focusing optical system. In addition, by using a single common housing member, that is, by forming at least a portion of the first focusing optical system and at least a portion of the second focusing optical system integrally, the positioning error of the two focusing optical systems can be reduced significantly. The material of the housing members U1 and U2 is not specifically limited, and it can be metal or resin. Metal should have a good thermal conductivity, and it may include a metal alloy. Using a light-weight metal such as aluminum alloy and magnesium alloy has a merit in that the frames and the supports that are light and highly rigid can be manufactured at low costs. Further, the use of a magnesium alloy enables to manufacture a metal housing member with a higher precision by thixomolding method, which is advantageous in realizing a high reflecting surface precision including precision of position and profile.

Resin can be selected from thermosetting resin, thermoplastic resin and ultraviolet curable resin in consideration of moldability, durability and other factors. For example, polycarbonate resin, acrylic resin, MS resin, polyolefin-based resin and the like can be used. In particular, since polyolefin-based resin has low hygroscopicity, it can suppress volume change caused by moisture absorption of the resin, and thus can realize a high focusing precision without being affected by the humidity of the environment in which the unit is used. Specific examples of the polyolefin-based material include ZEONEX (registered trademark) manufactured by Zeon Corporation. In addition, the resin is not necessarily formed of a single material, and resin in which inorganic fine particles or the like are dispersed to improve the properties as a material or impart functionality can also be used. In addition, the resin may be constituted by multiple layers of different materials.

According further to the imaging apparatus of the present embodiment, far infrared images can be captured without alteration of the optical device, by simply selecting an appropriate imaging device for far infrared regions, such as an imaging device for thermography purposes targeting a wavelength of approximately 3 to 17 μm. If far infrared imaging is to be performed by stereo imaging using dioptric systems including lenses and prisms, the simple exchange of imaging device will not be sufficient, and it will be necessary to change the material of the lenses from glass to germanium, for example.

According to the present embodiment, the stereo imaging optical system adopts a hollow housing configuration as described above, so that the same stereo imaging optical system can correspond to both visible light regions and far infrared regions. Therefore, the same imaging optical system can be used to easily provide a line-up of products for stereo imaging in the visible light region and in the far infrared region by changing only the imaging device, so that there is a merit in that the manufacturing costs of respective products can be suppressed significantly.

In consideration of the conditions described above, the configuration of the imaging optical system STU serving as the imaging portion illustrated in FIG. 1 will be described in further detail. As illustrated in FIG. 1, the imaging optical system STU includes the first focusing optical system LO1 and the second the focusing optical system LO2, each having a plurality of reflecting surfaces. The first and second focusing optical systems LO1 and LO2 have the first and second opening portions SP1 and SP2 arranged on the side closest to the object. The first and second imaging devices IMG1 and IMG2 are respectively arranged on the focusing surface of the first and second focusing optical systems LO1 and LO2. Now, the plurality of reflecting surfaces R2 to R6 of the imaging optical system STU is formed on the surface of the housing members U1 and U2 constituting a base of the imaging optical system STU.

The housing members U1 and U2 respectively correspond to optical frames 101 and 102 described later, which correspond to the frames illustrated in FIGS. 2 and 3. In FIG. 1, the focusing optical systems LO1 and LO2 arranged on the right and left sides include the housing members U1 and U2 which are further divided into two parts, which are housing members U1L and U1R and housing members U2L and U2R, but such divided configuration is not always necessary.

In the focusing optical systems LO1 and LO2 on right and left sides, fifth surfaces R6 and R6 corresponding to 107 and 113 described later are fixed to housing members U1L and U1R via housing members U3L and U3R serving as subframes. According to the present embodiment, the fifth surfaces R6 and R6 serving as final-stage reflecting surfaces that reflect imaging light are fixed in the optical system after having their positions and orientations adjusted with respect to the housing members U1L and U1R. In that case, by adopting a configuration where the fifth surfaces R6 and R6 are attached at first to the housing members U3L and U3R serving as subframes and enabling the positions and orientations of the housing members U3L and U3R with respect to the housing members U1L and U1R to be adjusted thereafter, it may be possible to facilitate adjustment operations. However, it may also be possible to adopt a configuration where the housing members U1L and U1R serving as subframes are not provided, and the fifth surfaces R6 and R6 corresponding to 107 and 113 described later are directly fixed to the housing members U1L and U1R.

In FIG. 1, the imaging lights are incident through the two opening portions SP1 and SP2 of the focusing optical systems LO1 and LO2. The imaging lights are sequentially reflected by respective mirrors constituting the plurality of reflecting surfaces from the second surfaces R2 to the sixth surfaces R6 of the focusing optical system LO1 and the focusing optical system LO2, and are respectively focused on the respective imaging devices IMG1 and IMG2. The positions of the opening portions SP1 and SP2 correspond to the positions of the entrance pupils of the focusing optical systems LO1 and LO2 composed of respective mirrors of the second surfaces R2 to the sixth surfaces R6. In FIG. 1, the reflecting surfaces of the second surfaces R2 to the sixth surfaces R6 respective constituting the focusing optical system LO1 and the focusing optical system LO2 have rotationally asymmetric shapes, for example. Further, the focusing optical systems LO1 and LO2 are configured as off-axial optical systems in which reference axes are bent as illustrated.

In a stereo imaging optical system, the precision of arrangement of reflection optical elements of the two focusing optical systems significantly affects the calculation of distances using two images after capturing the images using the stereo imaging optical system. The reflection optical system is advantageous in realizing a small-size system with high focusing performance, while it has two drawbacks in that it has high sensitivity to manufacturing errors in a single focusing optical system and in that the two focusing optical systems must be positioned in stereo arrangement with high precision.

Therefore, the present embodiment adopts a configuration as illustrated in FIG. 1 where the plurality of reflecting surfaces constituting the first focusing optical system LO1 are formed on the housing member U1 or U2, each of which is formed integrally, to constitute the imaging optical system STU.

Among the plurality of reflecting surfaces constituting the first focusing optical system LO1, the reflecting surfaces R3 and R5 arranged on the lower side of FIG. 1 are formed on the housing member U2. The reflecting surfaces R2, R4 and R6 arranged on the upper side of FIG. 1 are formed on the housing member U1. Similarly, the plurality of reflecting surfaces constituting the second the focusing optical system LO2 are arranged on the housing members U1 and U2. That is, among the plurality of reflecting surfaces constituting the second focusing optical system LO2, the reflecting surfaces R3 and R5 arranged on the lower side of FIG. 1 are formed on the housing member U2. Further, the reflecting surfaces R2, R4 and R6 arranged on the upper side of FIG. 1 are formed on the housing member U1.

That is, according to the focusing optical systems LO1 and LO2 of the present embodiment, the reflecting surfaces R3 and R5 are formed on the housing member U1 and the reflecting surfaces R2, R4 and R6 are formed on the housing member U2. The housing members U1 and U2 can be configured as integral optical frames 101 and 102 in which the backward side and the frontward side of the frames are integrated, instead of dividing the frame into four parts, U1R, U1L, U2R and U2L. Especially in an integrated configuration where the optical frames on the backward side and the frontward side are integrated, the operation of adjusting the mutual positional relationship of the two focusing optical systems LO1 and LO2 for stereo imaging basically becomes unnecessary.

Two drawbacks described above can be solved by the configuration. Further, since the first focusing optical system LO1 and the second focusing optical system LO2 are arranged so that the reference axes are bent, they include a plurality of reflecting surfaces having rotationally asymmetric curvatures with respect to the reference axes. By adopting such reflecting surfaces for the focusing optical systems LO1 and LO2, aberration correction can be performed more easily and the focusing performance can be enhanced.

In addition to the visible light range with a wavelength of 380 nm to 700 nm, it is even more preferable if the imaging devices IMG1 and IMG2 for stereo imaging could receive light of a wavelength band range that differs from the visible light, such as a near infrared band of approximately 1000 nm, and convert the light into electric signals. According to the present embodiment adopting a focusing optical system in which the optical surfaces having focusing and light-gathering powers, which are optical powers, are only configured of reflecting surfaces, there is no chromatic aberration, so that a high focusing performance can be maintained in a wider wavelength band range than the focusing optical system adopting the dioptric system. Therefore, information other than visible light can be acquired simultaneously using the same optical system by simply expanding the wavelength range of light sensed by the imaging device. Therefore, the present configuration enables to reduce the size of the imaging system compared to a camera system in which infrared camera devices are installed separately.

Further, the housing for supporting the first and second focusing optical systems LO1 and LO2 should also preferably be able to support the imaging devices IMG1 and IMG2. According to such configuration, the imaging devices can be fixed directly to the housing, so that the alignment operation for aligning the two focusing optical systems LO1 and LO2 and the respective imaging devices basically become unnecessary and the assembling process can be simplified, which is advantageous from the viewpoint of manufacturing costs.

As described, there are various advantages in the configuration of the imaging portion including the focusing optical systems LO1 and LO2 of the present embodiment. For example, the stereo camera apparatus may be configured by storing the above-described imaging portion together with image data input/output and a control board for driving the imaging devices IMG1 and IMG2 in an appropriate case or a housing not shown. For example, a stereo camera apparatus 800 configured as above and illustrated in FIGS. 8A and 8B can be used preferably as an onboard imaging apparatus on board a vehicle and the like for vehicle control or driving support.

Figure 8A:
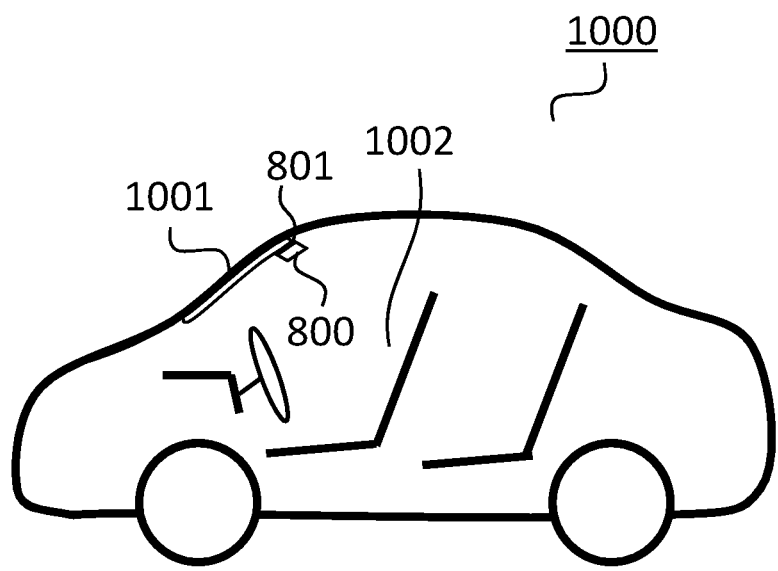
FIG. 8A is a schematic diagram of a vehicle incorporating a stereo camera apparatus according to the first embodiment as an onboard imaging apparatus.
Figure 8B:
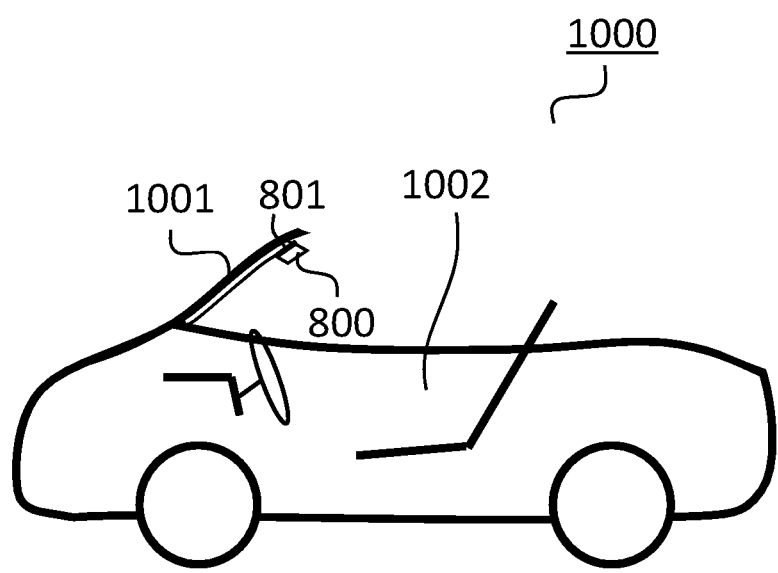
FIG. 8B is a schematic diagram of a vehicle incorporating a stereo camera apparatus according to the first embodiment as an onboard imaging apparatus.

The apparatus can be loaded on a vehicle as an onboard stereo camera apparatus 800 in the manner illustrated in FIGS. 8A and 8B. The stereo camera apparatus 800 is formed by storing an imaging optical system similar to the stereo imaging apparatus 100 illustrated in FIGS. 1 to 3 in a case. As illustrated in FIGS. 8A and 8B, the stereo camera apparatus 800 can be attached to an inner side of a windshield 1001 of a vehicle 1000 or an interior of a vehicle 1002. In that case, the stereo camera apparatus 800 is fixed to an interior of the vehicle via an appropriate attachment portion 801 such as an arm, a bracket or a mounting member.

In the examples illustrated in FIGS. 8A and 8B, the apparatus is attached to a portion in the interior of the vehicle 1002 near an upper edge of the windshield 1001 in both of the vehicles 1000. The stereo camera apparatus 800 can be installed to both the vehicle 1000 having a roof at the upper portion of the interior of the vehicle 1002 as illustrated in FIG. 8A and the vehicle 1000 having an upper portion of the interior of the vehicle 1002 opened, i.e., convertible, as illustrated in FIG. 8B. For example, the stereo camera apparatus 800 can be suitably incorporated to the windshield 1001 or the inner side of the ceiling close to the windshield. If it is necessary to measure the distance from other cars running behind the vehicle or the distance from an object when the car is in reverse gear using the stereo camera apparatus 800 in order to enhance the level of automatic driving or driving support, the stereo camera apparatus 800 may be attached to an inner side of a rear glass.

In the description illustrated above, an example of a case where the stereo imaging apparatus is adopted as an onboard imaging apparatus has been illustrated, but the stereo imaging apparatus according to the present embodiment can be applied not only to onboard apparatuses but also to other imaging apparatuses such as video cameras and digital still cameras that can be used for various purposes, such as mounting on a moving body such as a drone. In that case, the imaging system is not necessarily a stereo imaging system. The imaging apparatus according to the present embodiment can be used by connecting to a base body, such as a body or a frame, of various moving bodies via a connecting portion. The imaging apparatus having the configuration of the present embodiment can take images with high precision and high image quality for various uses without being affected by periphery temperature environments and so on, and can carry out a highly precise physical measurement based on the image being picked up.

FIGS. 2 and 3 illustrate a main portion of a stereo imaging apparatus 100 according to the present embodiment, especially the configuration of the stereo optical system thereof. FIG. 2 illustrates the stereo imaging apparatus 100 in perspective from the frontward side, that is, photographic subject side, and FIG. 3 illustrates the stereo imaging apparatus 100 in perspective from the backward side.

The stereo imaging apparatus 100 is an imaging apparatus that adopts a reflection optical system including a plurality of reflecting surfaces. In such an imaging apparatus, the optical sensitivity of the individual reflecting surfaces may become extremely high, as mentioned earlier, and it is extremely difficult to adjust the positions of all the reflecting surfaces and assemble the same.

The concept of "optical sensitivity", sometimes referred to simply as sensitivity, may be used with respect to the shape, optical power or position and orientation of the optical devices constituting the imaging optical system. This concept of optical sensitivity may be considered as the influence that the optical device has on the focusing phenomenon, as described below.

That is, optical sensitivity may refer to the influence regarding the light receiving position of imaging light on the imaging surface or imaging device;

optical sensitivity may refer to the influence regarding the peripheral light quantity of the imaging light on the imaging surface; and optical sensitivity may refer to the influence regarding the focusing state of the imaging light on the light receiving surface of the imaging device.

If the imaging optical system is composed of a plurality of reflection optical elements as in the present embodiment, the shape, the arrangement and position within the system and optical power of the respective reflection optical elements mutually differ. Therefore, the optical sensitivity mentioned above differ among the respective reflection optical elements.

We will consider a case where first and second reflection optical elements having different optical sensitivities are attached to the frame, that is, the housing members U1 and U2, wherein the optical sensitivity of the first reflection optical element is greater than the second reflection optical element. In that case, regarding the change of light receiving position of imaging light on the imaging surface of the imaging device, the change is greater in the case where the position and orientation of the first reflection optical element on the frame is changed than where the position and orientation of the second reflection optical element on the frame is changed.

Further, regarding the change of peripheral light quantity of imaging light on the imaging surface of the imaging device, the change is greater in the case where the position and orientation of the first reflection optical element on the frame is changed than where the position and orientation of the second reflection optical element on the frame is changed.

Even further, regarding the change of focusing state on the imaging surface of the imaging device, the change is greater in the case where the position and orientation of the first reflection optical element on the frame is changed than where the position and orientation of the second reflection optical element on the frame is changed.

We will now consider the easiness of the process of adjusting and fixing the reflection optical elements to intended positions and orientations at the time of manufacture of the off-axial optical system as in the present embodiment. In this case, for example, it is considered wise to adopt a configuration where the optical sensitivity of one element among the plurality of reflection optical elements is set higher and the optical sensitivity of other elements is set lower. As an example, the optical sensitivity of one reflection optical element is set high, or extremely high, and the optical sensitivity of other elements is set low. Thereby, in order to adjust the light receiving position, the peripheral light quantity and the focusing state of the imaging light to be set to the intended state, only the one reflection optical element having a high optical sensitivity should be adjusted. It may be possible to perform no adjustment regarding the other reflection optical elements having a low optical sensitivity, as long as a certain level of manufacture and assembly precision is ensured.

If the reflection optical element having a high optical sensitivity is used for adjusting the optical system, since the element has great influence on the light receiving position, that is, focusing position of received image, the peripheral light quantity and the focusing state, it may be possible to enhance the level of adjustment and facilitate the adjustment operation.

As described, by adopting a configuration where the optical sensitivity of one element among the plurality of reflection optical elements is set high and the optical sensitivity of other elements is set low, the position and orientation of the one reflecting surface having a high optical sensitivity can be adjusted with extremely high precision. Thereby, it becomes unnecessary to adjust all the optical surfaces included in the imaging optical system, so that the imaging optical system having a high precision can be realized at low cost.

Especially, in manufacturing and assembling the focusing optical systems LO1 and LO2 as illustrated in FIG. 1, the focusing state, especially the focusing position, of the captured image is considered important. From this point of view, it is considered that the reflecting surface having the highest optical sensitivity regarding the focusing position is the reflecting surfaces R6 and R6, which correspond to 107 and 113 described later, which are arranged immediately before the imaging devices IMG1 and IMG2 among the plurality of reflecting surfaces for sequentially reflecting the imaging lights. Therefore, the present embodiment designs the reflecting surfaces R6 and R6, which correspond to 107 and 113 described later, which are arranged immediately before the imaging devices IMG1 and IMG2 and the housing members U3L and U3R serving as subframes supporting the reflecting surfaces R6 and R6 as separate members from the housing member U1 serving as the frame. Then, after adjusting the positions and orientations of the reflecting surfaces R6 and R6, which correspond to 107 and 113 described later, and the housing members U3L and U3R serving as subframes supporting the reflecting surfaces R6 and R6 to the housing member U1 and determining the final positions and orientations thereof, the members are fixed at the determined positions and orientations. An assembly adjustment apparatus 200 (FIGS. 5 to 7) as described later may be used to perform such adjustment of positions and orientations of the reflecting surfaces R6 and R6, which correspond to 107 and 113 described later, the determination of the final positions and orientations or the fixing of the members by adhesion. It is also possible to refer to the final-stage reflecting surface R6 (107) as a first reflecting surface, the final-stage reflecting surface R6 (113) as a second reflecting surface, the housing member (U3L) as a first member and the housing member (U3R) as a second member.

For example, the stereo imaging apparatus 100 illustrated in FIG. 1 can be configured as illustrated in FIGS. 2 and 3 in further detail. As illustrated in FIGS. 2 and 3, the stereo imaging apparatus 100 according to the present embodiment includes an optical frame 101 corresponding to the housing member U1 of FIG. 1 and an optical frame 102 corresponding to the housing member U2 of FIG. 1. The optical frame 101 includes a first optical surface 103 corresponding to the reflecting surface R2 of FIG. 1 and a third optical surface 105 corresponding to the reflecting surface R4 of FIG. 1.

The optical frame 102 includes a second optical surface 104 corresponding to the reflecting surface R3 of FIG. 1 and a fourth optical surface 106 corresponding to the reflecting surface R5 of FIG. 1.

A fifth optical surface 107 corresponding to the reflecting surface R6 of FIG. 1 is arranged near the optical frame 101 as a separate member independent from the optical frame 101, and an imaging substrate 108 including a first imaging device 1081 is arranged at a position opposed thereto.

In the above configuration, the imaging light being incident on the stereo imaging apparatus 100 is reflected at first on the first optical surface 103 and then on the second optical surface 104. The imaging light is further sequentially reflected on the third optical surface 105 and the fourth optical surface 106 and finally on the fifth optical surface 107 before being received at the first imaging device 1081.

Further, the stereo imaging apparatus 100 illustrated in FIGS. 2 and 3 is a stereo optical system that includes optical surfaces that are arranged symmetrically with respect to the first optical surface 103 to the fifth optical surface 107. These optical surfaces are a sixth optical surface 109 arranged symmetrically with respect to the first optical surface 103, a seventh optical surface 110 arranged symmetrical with respect to the second optical surface 104, an eighth optical surface 111 arranged symmetrically with respect to the third optical surface 105 and a ninth optical surface 112 arranged symmetrically with respect to the fourth optical surface 106. A tenth optical surface 113 arranged symmetrically with respect to the fifth optical surface 107 is arranged separately and independently from the optical frame 101, similar to the fifth optical surface 107, and a second imaging device 1082 is arranged at a position opposed thereto. As described, the second imaging device 1082 is arranged at a position symmetric to the first imaging device 1081 with respect to the center of the stereo optical system.

In FIGS. 2 and 3, the first imaging device 1081 and the second imaging device 1082 are arranged on the same imaging substrate 108, but they are not necessary arranged on a single imaging substrate, and they can be arranged independently to different imaging substrates.

By configuring the optical system of the stereo imaging apparatus 100 in the manner described above, for example, a measuring process in which the image information picked up by the first imaging device 1081 and the second imaging device 1082 can be used to measure a distance from a target object serving as a photographic subject can be performed.

Next, the manufacturing method of the stereo imaging apparatus 100 of the present embodiment illustrated in FIGS. 1 to 4, especially the manufacturing method related to positioning and fixing of reflection optical elements of the imaging optical system, will be described. In the following description, the configuration and operation for automating the main part of the operation for positioning and fixing the reflection optical elements of the imaging optical system will also be described.

The process for manufacturing the stereo imaging apparatus (100) according to the present embodiment is roughly performed by the following steps.

(1) Among the plurality of reflection optical elements, the first reflection optical elements 107 and 113 having a high optical sensitivity with respect to imaging optical phenomenon and formed as separate members are created (first step).

(2) Among the plurality of reflection optical elements, the second reflection optical elements 103 to 106 and 109 to 112 that are independent from the first reflection optical elements are formed integrally to the optical frame 101 (second step).

(3) A state of arrival of imaging light to the attachment position of the imaging device is monitored, and according to the monitored result, the position and orientation in which the first reflection optical element is fixed to the optical frame 101 is determined (third step).

(4) According to the determined position and orientation, the first reflection optical element is fixed to the optical frame 101 by methods such as adhesion (fourth step).

Figure 4:
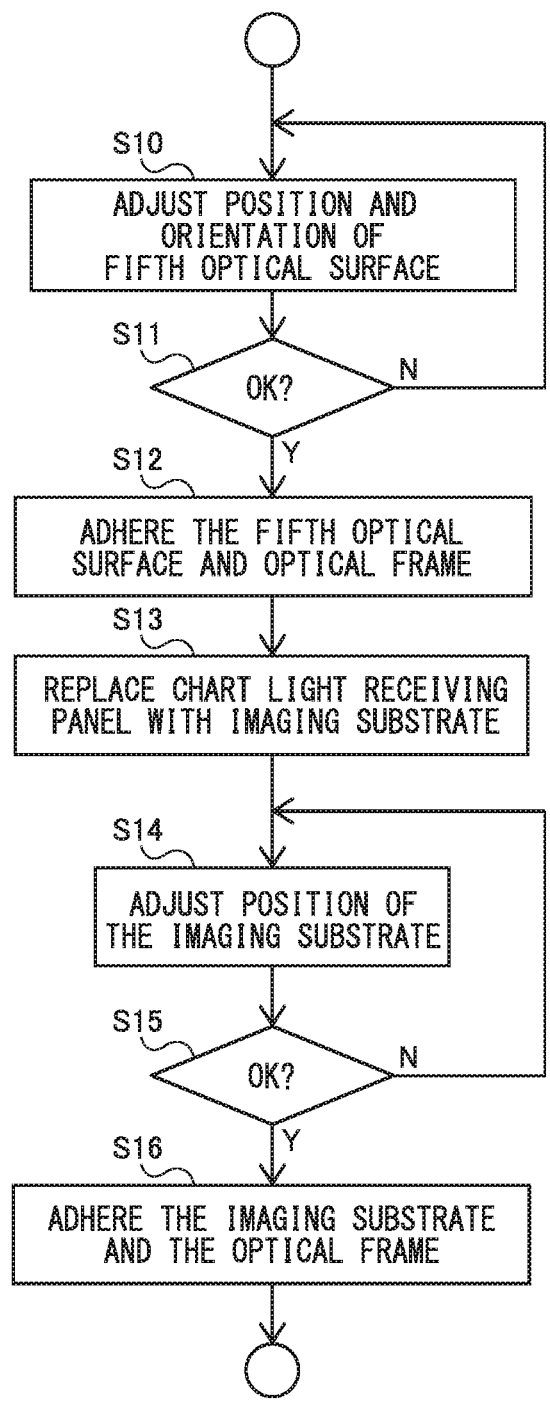
FIG. 4 is a flowchart illustrating a process of manufacturing the imaging apparatus according to the first embodiment of the present invention.

FIG. 4 is a flowchart of the process of manufacturing the stereo imaging apparatus 100 according to the present embodiment regarding the positioning and fixing of the reflection optical elements of the imaging optical system. FIG. 4 can be recognized as an operation procedure for operation by an operator or as a control procedure for performing automatic positioning and fixing of the reflection optical elements. In the following description, the procedure related to the fifth optical surface 107 is mainly illustrated as the positioning and fixing procedure of reflection optical elements, but of course, the procedure can be performed similarly for the other tenth optical surface 113.

Figure 5:
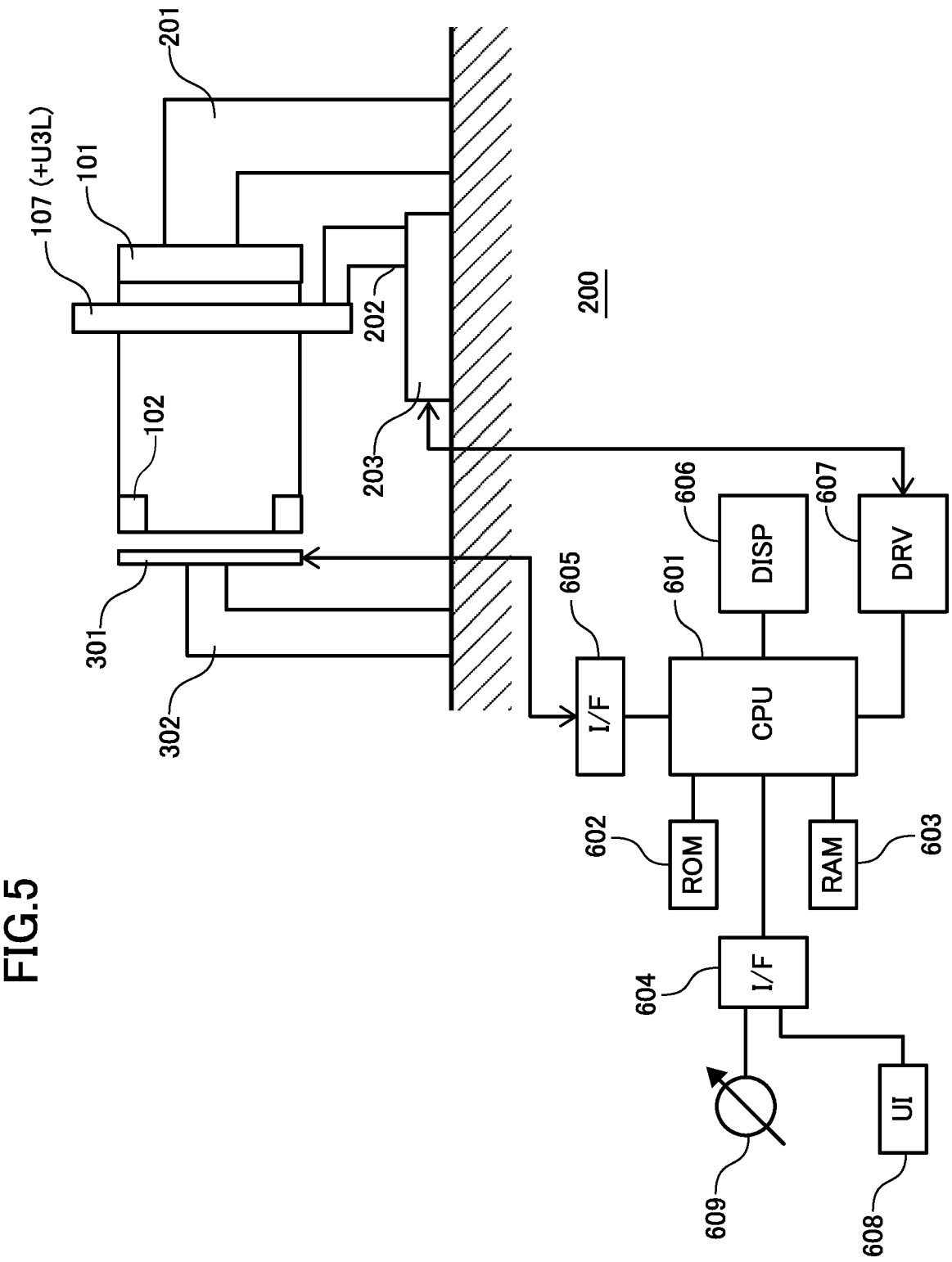
FIG. 5 is a schematic diagram illustrating a state of manufacture of the imaging apparatus according to the first embodiment of the present invention from a lateral direction of the apparatus.
Figure 6:
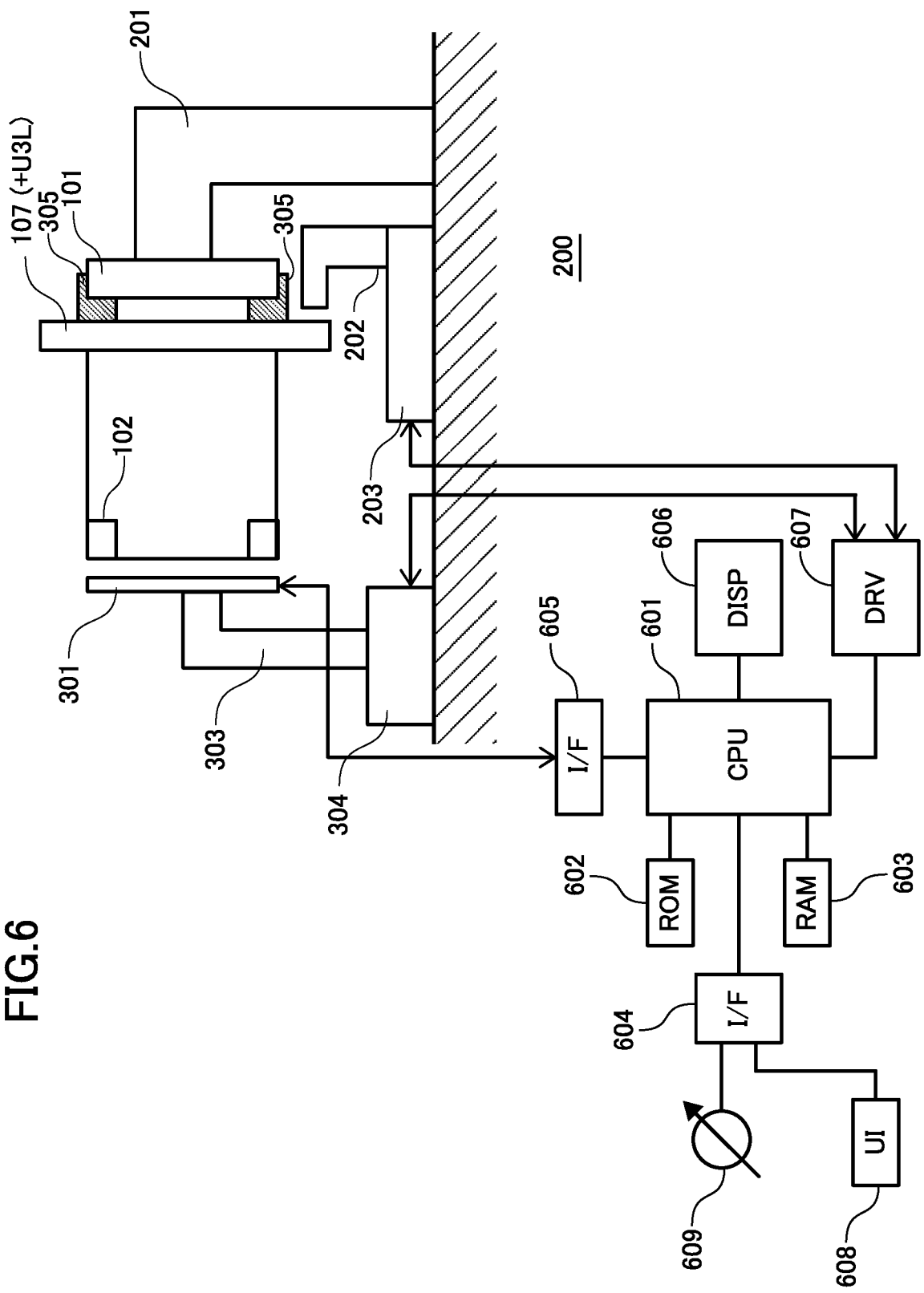
FIG. 6 is a schematic diagram illustrating a state of manufacture of the imaging apparatus according to the first embodiment of the present invention from a lateral direction of the apparatus.
Figure 7:
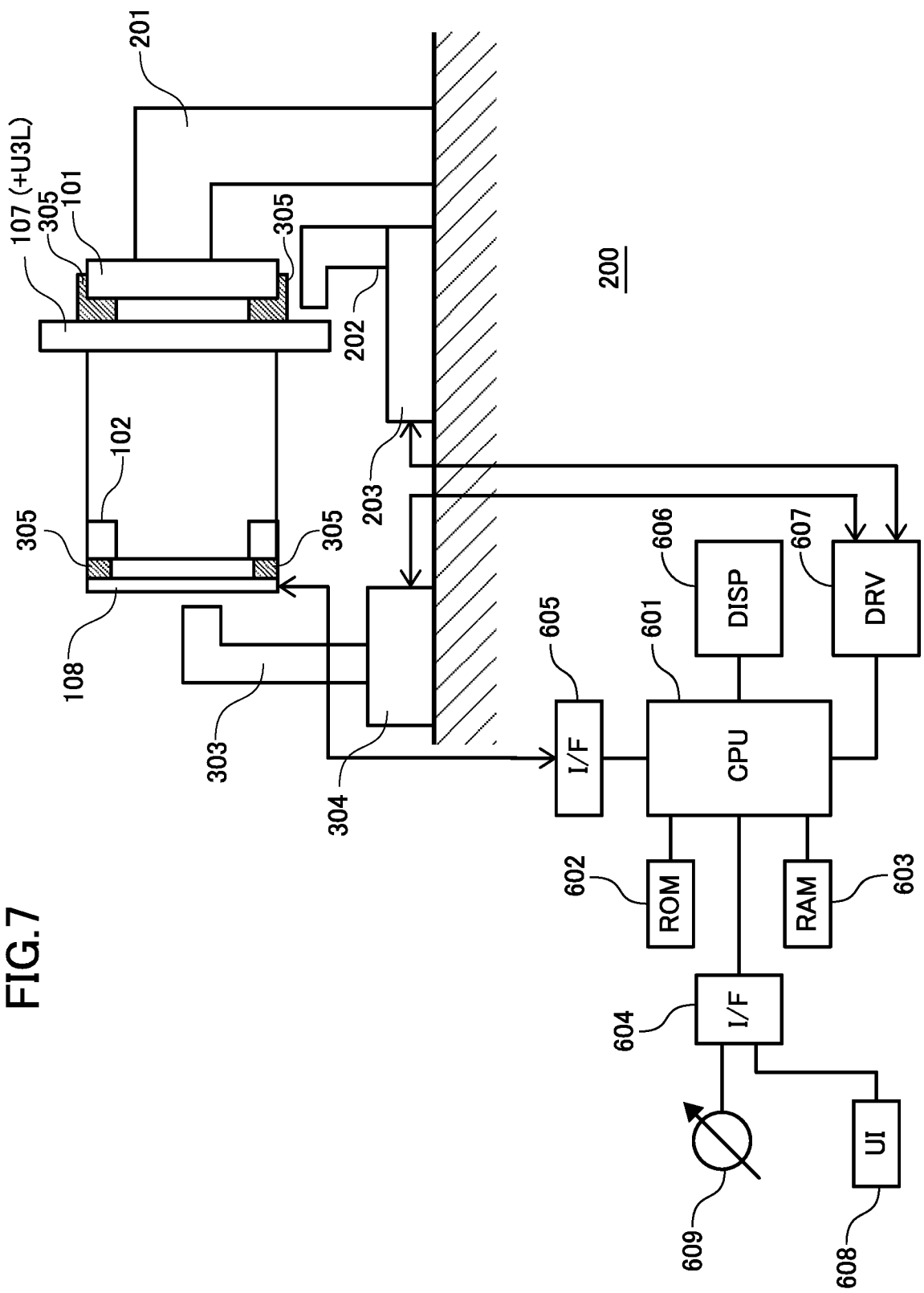
FIG. 7 is a schematic diagram illustrating a state of manufacture of the imaging apparatus according to the first embodiment of the present invention from a lateral direction of the apparatus.

FIGS. 5 to 7 illustrate an example of a configuration of an assembly adjustment apparatus for positioning and fixing the reflection optical elements, wherein the procedure for positioning and fixing the elements are sequentially illustrated from a lateral direction of the stereo imaging apparatus 100.

In a configuration where a housing member U3L serving as the subframe for supporting the fifth optical surface 107 is used, adjustment of position and orientation to the optical frame 101 is performed to the whole housing member U3L to which the fifth optical surface 107 has been fixed in advance. In a case where the housing member U3L serving as the subframe is fixed in advance to the optical frame 101 or in a case where the housing member U3L is not used, the position and orientation of the fifth optical surface 107 is directly adjusted. In the following description, for simplification, the housing member U3L will not be described, and the adjustment of position and orientation and the determination of the final position and orientation of the fifth optical surface 107 to the optical frame 101 will be described. However, the following description will also make sense if the member referred to as "the fifth optical surface 107" is recognized as an assembly in which the housing member U3L and the fifth optical surface 107 are fixed in advance. The same applies for the tenth optical surface 113 and a housing member U3R.

In FIGS. 5 to 7, an assembly adjustment apparatus 200 includes a base frame support 201 that supports the optical frame 101 of the stereo imaging apparatus 100.

For instance, in the state illustrated in FIG. 5, the positioning and fixing of the fifth optical surface 107 to the optical frame 101 is not completed. In FIG. 5, the fifth optical surface 107 is attached to an optical surface support table 202 arranged so that the position and orientation of the fifth optical surface 107 on the optical frame 101 is controlled independently. The optical surface support table 202 is configured so that the fifth optical surface 107 can be attached to and detached from the optical surface support table 202 via an appropriate attachment mechanism not shown. As described later, when fixing the fifth optical surface 107 to the optical frame 101 by adhesion and the like, the fifth optical surface 107 is removed from the optical surface support table 202.

The optical surface support table 202 is configured to adjust the position and orientation in which the fifth optical surface 107 is supported in six degrees of freedom by a six-axis adjustment mechanism 203. The six-axis adjustment mechanism 203 is configured as an adjustment mechanism in which a driving source such as a stepping motor or a servomotor that is commercially available is combined with an automatic stage adopting a linear guide. However, any arbitrary mechanism can be used as the six-axis adjustment mechanism 203, as long as the positions and orientations for supporting the fifth optical surface 107 can be adjusted in six degrees of freedom. For example, a mechanism in which a robot arm is applied to the six-axis adjustment mechanism 203 can be adopted.

The base frame support 201 and the six-axis adjustment mechanism 203 are not mechanically coupled and are arranged independently. The base frame support 201 and the six-axis adjustment mechanism 203 are preferably placed on a base, that is, shaded area of FIGS. 5 to 7, such as a common anti-vibration surface plate.

In FIG. 5, the optical surface support table 202 is connected to a drive unit of the six-axis adjustment mechanism 203 in a state where the fifth optical surface 107 is supported by a supporting portion thereof not shown. In this state, preferably, the fifth optical surface 107 is supported so that the center of rotation of the six-axis adjustment mechanism 203 corresponds to an optical center of the fifth optical surface 107.

In the assembly adjustment apparatus 200 described above, the two manufacturing operations which are the positioning and fixing of the fifth optical surface 107 on the optical frame 101 can be performed by manual operation, by semi-automatic operation including automatic control or by fully-automatic operation.

A control unit illustrated on the lower part of FIGS. 5 to 7 whose components are denoted by reference numbers in the 600s is illustrated as a configuration capable of corresponding to any of manual operation, semi-automatic operation and fully-automatic operation. The control unit adopts the following configuration.

The control unit illustrated on the lower part of FIGS. 5 to 7 includes a CPU 601 serving as a main control unit, a ROM 602 serving as a storage unit, and a RAM 603. The ROM 602 can store control programs for the CPU 601 and constant information for realizing the manufacturing process described later. The RAM 603 is used as a work area of the CPU 601 for executing the control procedure.

The control programs of the CPU 601 for realizing the control procedure described later can also be stored in an external storage unit such as an HDD or an SSD not shown or a storage unit such as an EEPROM area of the ROM 602.

In that case, the control programs of the CPU 601 for realizing the control procedure described later are supplied to the respective storage units mentioned above via a network interface not shown, or the programs can be updated to a new or different program. The control programs of the CPU 601 for realizing the control procedure described later is supplied via storage units such as various types of magnetic disks, optical disks and flash memories and drive devices of the storage units to respective storage units, or contents of the respective storage units can be updated in the same manner. The various types of storage units storing control programs of the CPU 601 for realizing the control procedure constitute a computer readable storage media storing the control procedure of the present invention.

In the control unit illustrated in FIGS. 5 to 7, a UI unit, i.e., user interface unit, 608 is connected to the CPU 601 via an interface 604. The UI unit 608 can be composed of a terminal such as a handy terminal, a device such as a keyboard or a pointing device and a control terminal equipped with such device.

The UI unit 608 can be used by the operator for controlling the position and orientation of the fifth optical surface 107 via the six-axis adjustment mechanism 203. For example, a manipulation device 609 such as a jog dial can be used to adjust the position and orientation of the fifth optical surface 107 accurately in very fine amounts. The manipulation device 609 can be included in the UI unit 608, but in the drawing, it is illustrated as an independent member.

The manipulated variable of the manipulation device 609 is detected by the CPU 601 via the interface 604. The CPU 601 drives the six-axis adjustment mechanism 203 via a driver 607 according to the operation of the manipulation device 609.

Further, the CPU 601 can be configured to detect via an interface 605 a light receiving state of a chart light receiving panel 301 supported by a support 302 to an attachment position of the first imaging device 1081 (FIG. 5). During manual operation for adjusting the position and orientation of the fifth optical surface 107 supported on the optical surface support table 202, for example, a chart not shown that represents a test pattern and the like is taken in via an opening portion SP1 and focused at the position of the chart light receiving panel 301. The operator monitors a chart image focused on the position of the chart light receiving panel 301 by imaging signals while adjusting the position and orientation for fixing the fifth optical surface 107 via the manipulation device 609 and the six-axis adjustment mechanism 203.

During automatic control, the light receiving state of the chart light receiving panel 301 is picked up by another imaging apparatus not shown being arranged separately, and the imaging data being picked up is transmitted via the interface 605 to the CPU 601. The CPU 601 performs image analysis of the imaging data, and based on the result of analysis, monitors the state of arrival of light to the chart light receiving panel 301. Based on this monitored result, the CPU 601 controls the six-axis adjustment mechanism 203 and automatically adjusts the position and orientation to which the fifth optical surface 107 is to be fixed. In performing automatic control, it may be possible to utilize the first imaging device 1081 (FIG. 3) to which the optical frame 101 is positioned and fixed in advance, instead of the chart light receiving panel 301.

A display 606 can be provided in the assembly adjustment apparatus 200. The display 606 constitutes a part of the UI unit 608, for example. Image picked up by the chart light receiving panel 301 or the image picked up by the first imaging device 1081 (FIG. 3) can be displayed on the display 606. Thereby, for example, the operator can adjust the position and orientation to which the fifth optical surface 107 is to be fixed via the manipulation device 609 while viewing the image displayed on the display 606.

A network interface not shown can be connected as a communication unit to the CPU 601. The CPU 601 can send and receive various control signals via the network interface. In that case, the network interface can be composed of a telecommunications standard by wire communication such as IEEE 802.3 or by wireless communication such as IEEE 802.11 and 802.15. The network interface can also be used for communication with a supervising control unit such as a PLC for performing production management on a production line according to the present embodiment, or for communication with a management server. Alternatively, in a case where another production apparatus or a manufacturing apparatus composed of a robot arm or an XY stage and the like is arranged on the production line of the imaging apparatus, the network interface can be used for communicating with such production or manufacturing apparatus.

Next, a manufacturing process of positioning and fixing the fifth optical surface 107 according to the configuration of FIGS. 5 to 7 with reference to the flowchart of FIG. 4 will be illustrated. The sequential order of the steps illustrated in FIG. 4 is merely an example, and in the following description, an example is illustrated where an outline of an example of the process for positioning and fixing the fifth optical surface 107 is mainly performed manually by an operator.

In steps S10 and S11 of FIG. 4, the position and orientation of the fifth optical surface 107 supported on the optical surface support table 202 with respect to the optical frame 101 as illustrated in FIG. 5 is adjusted via the six-axis adjustment mechanism 203. In this case, it is assumed that the optical frame 102 is already assembled to the optical frame 101 as illustrated in FIGS. 2 and 3.

As for the optical surfaces other than the fifth optical surface 107 or the tenth optical surface 113, it is assumed that the optical surfaces are already integrated to the optical frames 101 and 102. The optical surfaces other than the fifth optical surface 107 or the tenth optical surface 113 can be integrated with the optical frames 101 and 102 by means such as direct deposition of a metal film such as a reflecting surface on the optical frames 101 and 102. Alternatively, the optical surfaces other than the fifth optical surface 107 or the tenth optical surface 113 can be integrated to the optical frames 101 and 102 by creating the optical surface as independent elements using a material and a method capable of ensuring an appropriate precision range and integrating the elements to the optical frames 101 and 102 in advance by adhesion and other methods. According to any configuration, prior to adjusting the position and orientation of the fifth optical surface 107 or the tenth optical surface 113, it is assumed that the other optical surfaces have already been integrated to the optical frames 101 and 102.

In the case of manual operation, adjustment of position of the fifth optical surface 107 is performed by focusing via the opening portion SP1 a chart image not shown formed of a test pattern prepared in advance on the position of the chart light receiving panel 301 via the optical system. Then, the operator adjusts the position and operation to which the fifth optical surface 107 should be fixed by observing the chart image focused on the chart light receiving panel 301 and using the manipulation device 609 and the six-axis adjustment mechanism 203. The manipulation device 609 is used for driving and manipulating the six-axis adjustment mechanism 203.

In this state, it is assumed that the position of the chart light receiving panel 301 is identical to the design position of the first imaging device 1081 (FIG. 3) or the position is set to a test position that has been optimized in advance. Alternatively, a light receiving device for measurement may be arranged instead of the chart light receiving panel 301, and the CPU 601 may have the received image displayed on the display 606. In that case, the operator will observe the chart image focused by the optical system on the display 606.

In a state where the chart image is in an intended state (FIG. 4, step S11: Y), the position and orientation of the fifth optical surface 107 in that state is determined as the final position and orientation in which the fifth optical surface 107 is fixed to the optical frame 101.

Thereafter, in step S12 of FIG. 4, the fifth optical surface 107 and the optical frame 101 are adhered by an adhesive 305 as illustrated in FIG. 6, and the fifth optical surface 107 is fixed at the final position and orientation described above. As for the adhesive 305, any arbitrary material such as an ultraviolet curable resin can be used as the adhesive 305. In a case where the optical frame 101 and the fifth optical surface 107 or the housing member U3R serving as the subframe supporting the fifth optical surface 107 are formed of metal material, a fixing method of brazing or soldering can be used to join the members.

Thereafter, the adhesive 305 is cured sufficiently, and the coupling of the fifth optical surface 107 and the optical surface support table 202 is cancelled (FIG. 6). If the position of the chart light receiving panel 301 and the error from the design position of the first imaging device 1081 is within an appropriate precision range, the imaging substrate 108 can be fixed to the optical frame 102 using the adhesive 305 (FIG. 7). For example, immediately after step S12 of FIG. 4, the chart light receiving panel 301 can be removed and the imaging substrate 108 can be fixed using the adhesive 305 to the optical frame 102. In the configuration example of FIGS. 2 and 3, the first and second imaging devices 1081 and 1082 are loaded to the common imaging substrate 108. However, in a state where these imaging devices are loaded on separate substrates, the position and orientation of the second imaging device 1082 on a separate substrate is adjusted independently after adjusting the tenth optical surface 113.

According to the procedure of FIG. 4, however, the adjustment and determination of position and orientation of the first imaging device 1081 and the adhesion thereof are performed in steps S13 to S16 by a method similar to the above-described method. In step S13, the chart light receiving panel 301 is removed and replaced with the imaging substrate 108 on which the first imaging device 1081 is loaded. In this state, as illustrated in FIG. 7, the imaging substrate 108 is retained on the optical surface support table 202 and arranged to an initial position of adjustment. In the example of FIG. 7, the position and orientation of the imaging substrate 108 is set to be adjusted by a six-axis adjustment mechanism 304 similar to that illustrated above via the optical surface support table 202. Similar to the case of the six-axis adjustment mechanism 203, the six-axis adjustment mechanism 304 is driven by the CPU 601 via the driver 607 according to the manipulated variable of the manipulation device 609.

In this state, a testing image such as the chart image similar to that illustrated above is picked up by the optical system, and the image data picked up by the first imaging device 1081 of the imaging substrate 108 is transmitted to the CPU 601 via the interface 605. If the adjustment of position and orientation of the imaging substrate 108 is also performed manually, the image data picked up by the first imaging device 1081 can be displayed on the display 606 similar to the example illustrated above.

In steps S14 and S15 of FIG. 4, the operator adjusts the position and operation of the imaging substrate 108 by the six-axis adjustment mechanism 304 via the manipulation device 609 while observing the display on the display 606 output in the above-described manner. Then, when the chart image is in the intended state (FIG. 4, step S15: Y), the position and orientation of the imaging substrate 108 in that state is determined as the final position and orientation in which the imaging substrate 108 is to be fixed to the optical frame 102.

Thereafter, in step S16 of FIG. 4, the imaging substrate 108 and the optical frame 102 are adhered by an adhesive 305, and the imaging substrate 108 is fixed at the final position and orientation described above.

Further, the tenth optical surface 113 or a second imaging device 1082 corresponding to the tenth optical surface 113 is subjected to similar adjustment of position and orientation, determination of final position and orientation and the fixing process, to thereby complete the imaging optical system of the stereo imaging apparatus 100 (FIGS. 2 and 3).

In the above-illustrated example, the manufacturing control procedure of FIG. 4 was described taking the manual operation as an example, but all or an arbitrary part of the procedure can be automated as described below by the control performed by the CPU 601 of the assembly adjustment apparatus 200. In that case, the control procedure executed by the CPU 601 may be stored as the control program of the CPU 601 in the ROM 602 or the external storage unit as described earlier.

For example, processing of image by the CPU 601 and the drive control of the six-axis adjustment mechanism 203 based thereon can be performed during the adjustment of position and orientation and the determination of final position and orientation of the fifth optical surface 107 in steps S10 and S11 of FIG. 4. In that case, the CPU 601 analyzes the output, specifically the image data picked up by the light receiving device for measurement arranged at the position of the chart light receiving panel 301 or, if the imaging substrate 108 is attached in advance, the output of the first imaging device 1081. Based on appropriate control standards created in advance according to the analysis result, the CPU 601 drives the six-axis adjustment mechanism 203 and adjusts the position and orientation of the fifth optical surface 107. Further, if the CPU 601 determines that the final position and orientation has been obtained based on an appropriate criteria created in advance according to the analysis result, the position and orientation in that state is determined as the final position and orientation in which the fifth optical surface 107 should be fixed to the optical frame 101 (step S11: Y).

The adjustment of the position and orientation of the imaging substrate 108 and the determination of the final position and orientation thereof in steps S14 and S15 of FIG. 4 are performed similarly, and in that case, the image data output from the first imaging device 1081 of the imaging substrate 108 is analyzed by the CPU 601. Based on appropriate control standards created in advance according to the analysis result, the CPU 601 drives the six-axis adjustment mechanism 304 and adjusts the position and orientation of the imaging substrate 108. Further, if the CPU 601 determines that the final position and orientation has been obtained based on an appropriate criteria created in advance according to the analysis result, the position and orientation in that state is determined as the final position and orientation in which the imaging substrate 108 should be fixed to the optical frame 102 (step 815: Y).

In addition, the adhesion and fixture of the fifth optical surface 107 or the imaging substrate 108 can be automated by manufacturing control in which the CPU 601 uses a robot arm not shown arranged independently to apply the adhesive 305 by operating a tool such as a glue gun.

As described, according to the present embodiment related to the imaging apparatus adopting the reflection optical system including the plurality of reflection optical surfaces and the manufacturing method thereof, first reflection optical elements having a high optical sensitivity among the plurality of reflection optical elements are formed as a separate structure from the optical frame. As for the second reflection optical elements having a low optical sensitivity and having only a small influence on the performance of the imaging optical system, they are integrated with the optical frame in advance and are not subjected to adjustment operation. Then, the position and orientation of the first reflection optical elements having a high optical sensitivity with respect to the focusing on the imaging device are adjusted independently with respect to the optical frame to which the second reflection optical elements are integrated in advance, and the final position and orientation after adjustment of the first reflection optical elements are determined.

According to this configuration, a highly precise imaging apparatus can be manufactured at low manufacturing costs without the need to adjust all the plurality of reflection optical surfaces of the reflection optical system. In the above-described example, reflection optical elements having a high optical sensitivity regarding the focusing of image on the imaging device serve as the first reflection optical elements whose position and orientation can be adjusted independently. The reflection optical elements immediately before the imaging device are adopted as the first reflection optical elements in the example. However, the first reflection optical elements whose position and orientation can be independently adjusted are not necessary the reflection optical elements arranged immediately before the imaging device, and the first reflection optical elements are determined depending on which optical sensitivity of various properties relate to imaging is given weight. If precision of factor of the image being picked up is given weight, it may be preferable to set the optical elements having the greatest optical power or amount of convergence among the plurality of reflection optical elements to be the first reflection optical elements whose position and orientation can be adjusted independently. In that case, the reflection optical elements whose optical power or amount of convergence is set to be the greatest are not necessary arranged immediately before the imaging device, and they may be arranged as the reflection optical elements in midway of the optical path.

By applying the stereo imaging apparatus according to the present embodiment to an imaging apparatus such as a video camera or a digital still camera, a stereo imaging apparatus having a high optical performance and light weight that can be manufactured easily is realized. Especially, the stereo imaging apparatus of the present embodiment applied to onboard uses as illustrated in FIGS. 8A and 8B enables to realize stereo imaging by a small, light-weight configuration, and based thereon, distance can be measured or three-dimensional shape can be acquired with high precision. As described, the present embodiment has an advantageous effect in that an imaging apparatus with high precision in which a reflection optical system including a plurality of reflection optical elements are adopted in the imaging optical system can be manufactured easily at low costs.

Second Embodiment

Now, an imaging apparatus according to a second embodiment will be described. The portions of the imaging apparatus of the second embodiment that differ from the first embodiment are mainly described.

According to the imaging apparatus of the second embodiment, the shapes of the housing members U3L and U3R and the shapes where the housing members U1L and U1R are in contact with the housing members U3L and U3R differ from the first embodiment. Now, the actual example will be described with reference to FIG. 9.

Two projections 902 are provided on the housing member U1L that serves as a main frame. Two holes 901 are provided on the housing member U3L that serves as a subframe at positions opposed to the projections 902 of the housing member U1L. The housing member U3L is moved close to the housing member U1L, an adhesive not shown is poured between the holes 901 and the projections 902, and when the adhesive is cured, the housing member U1L and the housing member U3L are bonded.

Figure 10:
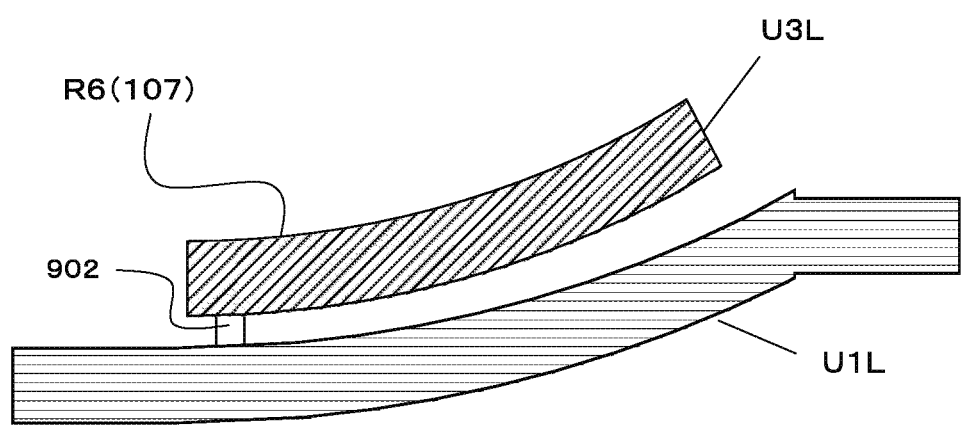
FIG. 10 is a schematic diagram illustrating a positional relationship of the projections and holes of the imaging apparatus according to the second embodiment.

FIG. 10 is a view of the state where housing member U1L and the housing member U3L are bonded, taken from a direction perpendicular to a bonding surface. When this bonding step is performed, the adjustment of position can be performed with high precision compared to a state where the whole subframe is bonded to a mainframe.

Figure 9:
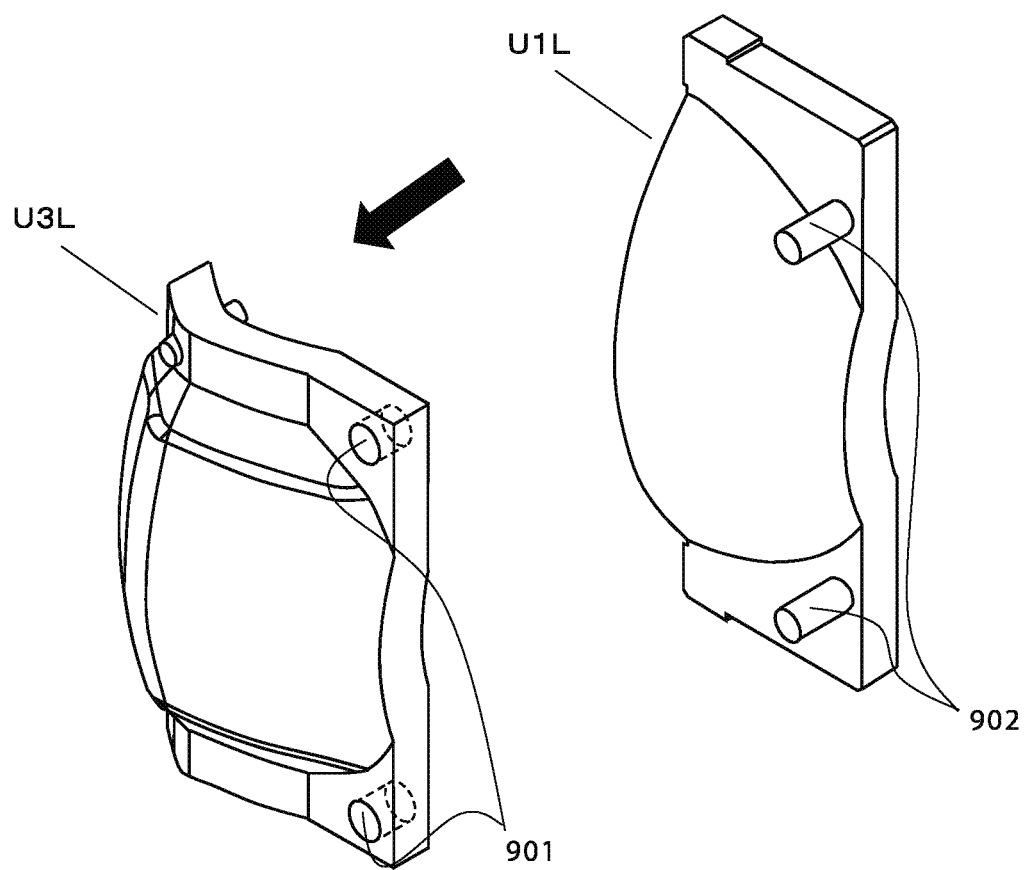
FIG. 9 is a schematic diagram of projections and holes of an imaging apparatus according to a second embodiment.

In FIG. 9, the shape of the projections 902 is cylindrical and the shape of the holes 901 is circular, but the shapes of the projections and holes are not limited to this example. The projections 902 may be polygonal columns and the opening shape of the holes 901 may be polygonal. Meanwhile, the holes 901 may be formed on the housing member U1L serving as the mainframe, and the projections 902 may be formed on the housing member U3L serving as the subframe. The number of the projections 902 is not limited to two, and it can be one, or even three or more. From the viewpoint of manufacturing the frame and the projections in a single process, the material of the projections should preferably be the same as the material of the frame on which the projections are provided. The adhesive is not limited to a certain type, and for example, an adhesive that is cured by chemical reaction, a thermoplastic resin, a thermosetting resin or an ultraviolet curable resin can be used.

Next, preferable shapes of the housing member U1L serving as the mainframe and the housing member U3L serving as the subframe and the positional relationships thereof are described. Specifically, the configuration aims at reducing temperature distribution that occurs on the fifth optical surfaces 107 and 113.

The distance between the housing members U1 and U3 should preferably be 2 mm or less. Further, the ratio of maximum value to minimum value of the distance between the housing members U1 and U3 should preferably be 1.5 or less. The ratio of maximum thickness to minimum thickness of the housing member U3 should preferably be 1.3 or less. In any case, the temperature distribution that occurs to the housing member U3 can be reduced.

The portion of the housing member U1 that opposes to the housing member U3 should preferably be composed of a curved surface. This is preferable since the ratio of the maximum value to the minimum value of the distance between the housing members U1 and U3 can be set low in a case where a reflecting surface having a free-form surface is formed on the housing member U3.

An elastic member having a thermal conductivity of 1.0 W/m·K or more can be provided between the housing member U1 and the housing member U3. Thermal conduction between the housing member U1 and the housing member U3 can be enhanced to reduce the temperature distribution of the housing member U3. The elastic member should preferably in the form of a sheet, and the material should preferably be silicon-based, from the viewpoint of having a low hardness. An example of a commercially available material is a FEATHER series material manufactured by Sekisui Polymatech Co., Ltd.

Example 1

Figure 11:
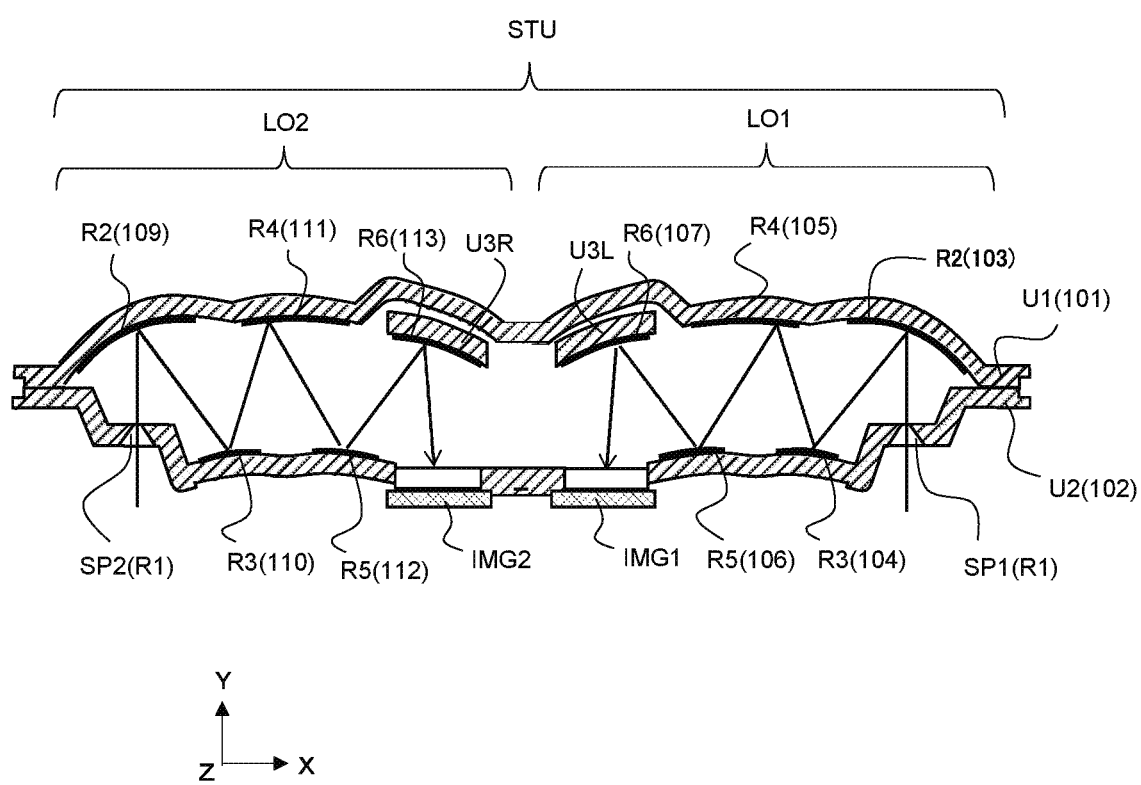
FIG. 11 is a cross-sectional view of an imaging optical system of the imaging apparatus according to the second embodiment of the present invention.

An imaging apparatus illustrated in FIG. 11 is manufactured according to the procedure illustrated below.

At first, the housing members U1 (101) and U2 (102) serving as mainframes were manufactured by injection molding using a resin material. A polyolefin-based resin called ZEONEX (registered trademark) E48R manufactured by Zeon Corporation was used as the resin. The housing members U1 and U2 were each set to have a length, corresponding to direction x in FIG. 11, of 200 mm, a height, corresponding to direction z in FIG. 11, of 40 mm and a thickness, corresponding to direction y in FIG. 11, of 4 mm. Two cylindrical projections0 902 were respectively provided on connecting portions of the housing members U3R and U3L. The size of the projection was set to have a diameter of 3 mm and a height of 5 mm.

Next, housing members U3R and U3L serving as subframes were manufactured by injection molding a resin material. A polyolefin-based resin called ZEONEX (registered trademark) E48R manufactured by Zeon Corporation was used as the resin. The housing members U3R and U3L were each set to have a length, corresponding to direction x in FIG. 11, of 54 mm, a width, corresponding to direction z in FIG. 11, of 20 mm and a thickness, corresponding to direction y in FIG. 11, of 4 mm. Two holes 901 each having a diameter of 3.5 mm were respectively formed on the housing members U3R and U3L.

Then, reflecting surfaces were formed on the housing members U1 and U2 and U3R and U3L by vapor deposition. The reflecting surfaces serving as reflection films were formed as aluminum films.

Next, the housing member U1 and the housing member U2 were bonded.

Then, the housing members U3R and U3L were respectively moved close to the housing member U1, and ultraviolet curing adhesive called World Rock (registered trademark) 8120TT manufactured by Kyoritsu Chemical & Co., Ltd. was applied between the projections and the holes. Ultraviolet radiation was irradiated to the ultraviolet curing adhesive, by which the housing member U1 and the housing members U3R and U3L were bonded, and the imaging apparatus according to the present embodiment was obtained.

Since the housing member U1 and the housing members U3R and U3L are bonded by projections and holes according to the present embodiment, the adjustment of position of the reflecting surfaces having a high optical sensitivity was realized at a relatively short period of time.

Evaluation of Temperature Characteristics

Next, simulation evaluation of temperature change of the housing member U3 according to the imaging apparatus described above was performed in a case where maximum distance t1 and minimum distance t2 between the housing member U1 and the housing member U3 and maximum thickness t3 and minimum thickness t4 of the housing member U3 differ.

Thermal analysis was performed using NX CAE produced by Siemens PLM Software Inc. as simulation software. As for analysis conditions, initial temperature of the housing member U1 was set to 20° C. and the temperature of the housing member U3 was set to 25° C., and temperature differences between the housing members U1 and U3 and temperature distribution on a mirror surface of the housing member U3 after 600 seconds from the initial state were evaluated. The thermal conductivity of the housing members U1 and U3 were set to 0.2 W/m·K, specific heat was set to 1100 J/kg·K (and thermal conductivity of atmosphere between the housing members U1 and U3 was set to 0.1 W/m·K. Three models illustrated in FIGS. 12A, 12B and 12C were used for the analysis.

Figure 12A:
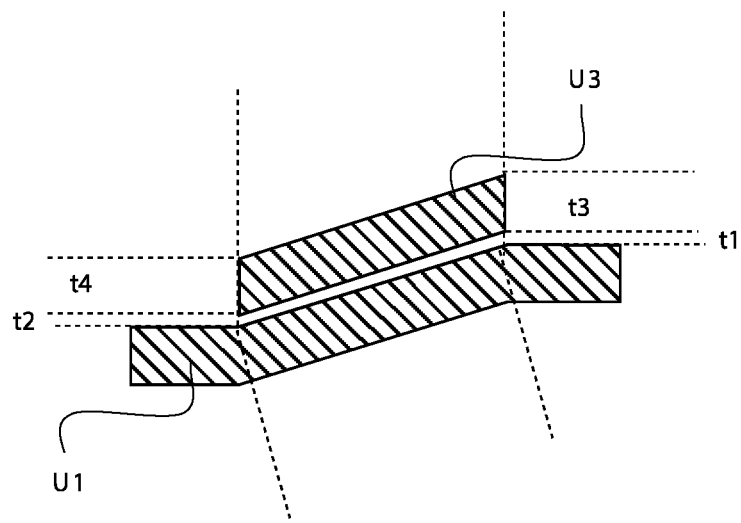
FIG. 12A is a schematic diagram illustrating a model to which thermal analysis has been carried out of the imaging apparatus according to the second embodiment of the present invention.

The model illustrated in FIG. 12A is a model in which the condition was set to t1=t2 and t3=t4. In this state, distances t1 and t2 which are the distance between the housing members U1 and U3 were varied between 1 mm and 10 mm to perform thermal analysis simulation. The thicknesses of U1 and U3 were 4 mm. The results are shown in Table 1.

Figure 12B:
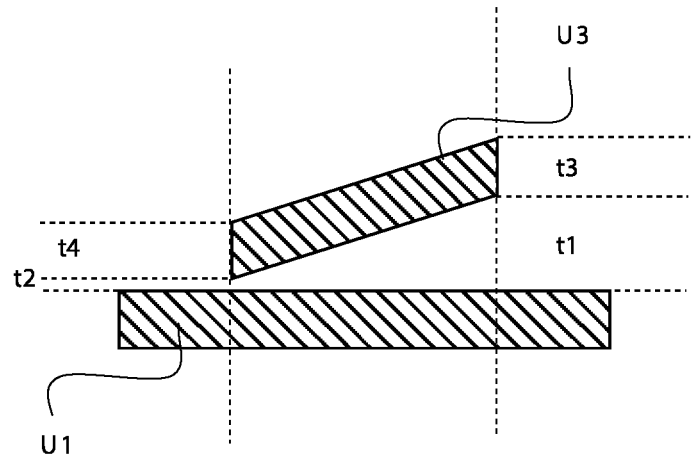
FIG. 12B is a schematic diagram illustrating a model to which thermal analysis has been carried out of the imaging apparatus according to the second embodiment of the present invention.

The model illustrated in FIG. 12B is a model in which the condition was set to t3=t4 and the ratio of t1 and t2 was variable. In this state, a minimum distance t2 of the distance between the housing members U1 and U3 was fixed to 1 mm and the maximum distance t1 was varied between 1 mm and 10 mm to perform thermal analysis simulation. The thickness of U1 was set to 4 mm. The results are shown in Table 2.

Figure 12C:
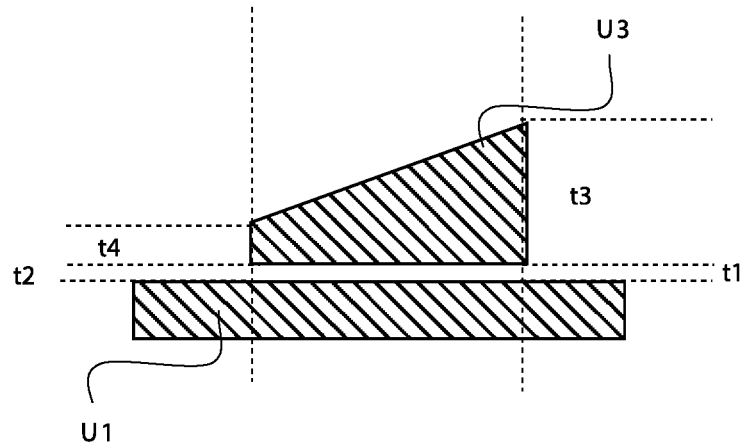
FIG. 12C is a schematic diagram illustrating a model to which thermal analysis has been carried out of the imaging apparatus according to the second embodiment of the present invention.

The model illustrated in FIG. 12C is a model in which the condition was set to t1=t2 and the ratio of t3 and t4 was variable. In this state, t1 and t2 which are the distances between the housing members U1 and U3 was fixed to 1 mm, the minimum thickness t4 of the housing member U3 was fixed to 4 mm, and a maximum thickness t3 was varied between 4 mm and 13 mm to perform thermal analysis simulation. The thickness of U1 was set to 4 mm. The results are shown in Table 3.

The evaluation items and criteria of evaluation in Tables 1 to 3 are as follows.

Item 1 is a numerical value obtained by evaluating a half-value period at which a temperature difference of the housing members U1 and U3 is reduced to half from the initial temperature of 5° C. to 2.5° C. and then dividing the evaluated value by the longest half-value period which is the longest time of the half-value period.

Item 2 is a numerical value obtained by evaluating the difference between maximum value and minimum value of temperature calculated at any five arbitrary points of the housing member U3 and then dividing the evaluated value by a maximum distribution temperature which is the maximum value thereof.

Evaluation A means Item 1 is 0.50 or less and Item 2 is 0.25 or less.

Evaluation B means Item 1 is greater than 0.50 or Item 2 is greater than 0.25.

TABLE 1

| t1(mm) | t2(mm) | t3(mm) | t4(mm) | ITEM 1 | ITEM 2 | EVALUATION |
|---|---|---|---|---|---|---|
| 1 | 1 | 4 | 4 | 0.37 | 0.25 | A |
| 2 | 2 | 4 | 4 | 0.49 | 0.24 | A |
| 3 | 3 | 4 | 4 | 0.62 | 0.36 | B |
| 4 | 4 | 4 | 4 | 0.76 | 0.46 | B |
| 10 | 10 | 4 | 4 | 1 | 1 | — |

TABLE 2

| t1(mm) | t2(mm) | t1/t2 | t3(mm) | t4(mm) | ITEM 1 | ITEM 2 | EVALUATION |
|---|---|---|---|---|---|---|---|
| 1 | 1 | 1 | 4 | 4 | 0.46 | 0.20 | A |
| 1.2 | 1 | 1.2 | 4 | 4 | 0.48 | 0.22 | A |
| 1.5 | 1 | 1.5 | 4 | 4 | 0.50 | 0.25 | A |
| 2 | 1 | 2 | 4 | 4 | 0.53 | 0.39 | B |
| 3 | 1 | 3 | 4 | 4 | 0.60 | 0.68 | B |
| 5 | 1 | 5 | 4 | 4 | 0.74 | 0.96 | B |
| 10 | 1 | 10 | 4 | 4 | 1 | 1 | — |

TABLE 3

| t1(mm) | t2(mm) | t3(mm) | t4(mm) | t3/t4 | ITEM 1 | ITEM 2 | EVALUATION |
|---|---|---|---|---|---|---|---|
| 1 | 1 | 4 | 4 | 1 | 0.16 | 0.17 | A |
| 1 | 1 | 4.6 | 4 | 1.15 | 0.21 | 0.17 | A |
| 1 | 1 | 5.2 | 4 | 1.3 | 0.23 | 0.24 | A |
| 1 | 1 | 6 | 4 | 1.5 | 0.30 | 0.45 | B |
| 1 | 1 | 7 | 4 | 1.75 | 0.37 | 0.61 | B |
| 1 | 1 | 9 | 4 | 2.25 | 0.58 | 0.81 | B |
| 1 | 1 | 13 | 4 | 3.25 | 1 | 1 | — |

Based on the results of Table 1, it could be recognized that the temperature distribution that occurs to the housing member U3 is reduced if the distance between the housing members U1 and U3 is 2 mm at maximum or less.

Based on the results of Table 2, it could be recognized that the temperature distribution that occurs to the housing member U3 is reduced if the ratio of the maximum value to the minimum value of the distance between the housing members U1 and U3 is 1.5 or less.

Based on the results of Table 3, it could be recognized that the temperature distribution that occurs to the housing member U3 is reduced if the ratio of the maximum thickness to the minimum thickness of the housing member U3 is 1.3 or less.

The present invention is not limited to the embodiments and examples illustrated above, and various modifications are enabled within the technical concept of the present invention.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An apparatus comprising:
a first reflection optical system comprising a plurality of reflecting surfaces which reflects a light; and
a frame,
wherein a part of the plurality of reflecting surfaces is a reflecting surface provided on the frame,
wherein, among the plurality of reflecting surfaces, a final-stage reflecting surface configured to reflect the light toward a first final focusing surface is a first reflecting surface formed on a surface of a first member, and
wherein a change of light receiving position of the light at a predetermined position in a case where a position and orientation of the first reflecting surface with respect to the frame is changed is greater than a change of light receiving position of the light at the predetermined position in a case where a position and orientation of the reflecting surface provided on the frame with respect to the frame is changed.

2. The apparatus according to claim 1, wherein the first member is supported on the frame.

3. The apparatus according to claim 1, wherein the reflecting surface provided on the frame is a reflection film formed on a curved surface of the frame.

4. The apparatus according to claim 1, wherein the first reflection optical system comprises a mirror element.

5. The apparatus according to claim 1, wherein the first member is fixed to the frame by adhesive.

6. The apparatus according to claim 1, wherein one of the first member and the frame comprises a projection, and wherein the other one of the first member and the frame comprises a hole.

7. The apparatus according to claim 1, wherein a ratio of a maximum value to a minimum value of a distance between the first member and the frame is 1.5 or less, and
wherein a ratio of a maximum value to a minimum value of a thickness of the first member at a position opposed to the frame is 1.3 or less.

8. The apparatus according to claim 1, wherein a distance between the first member and the frame is 2 mm or less.

9. The apparatus according to claim 1, wherein the first final focusing surface is a light receiving surface of a first imaging device that receives the light reflected through the first reflection optical system.

10. The apparatus according to claim 1, further comprising:
a second reflection optical system, of which an optical axis is different from an optical axis of the first reflection optical system, the second reflection optical system comprising a plurality of reflecting surfaces which reflects a light,
wherein a part of the plurality of reflecting surfaces of the second reflection optical system is a reflecting surface provided on the frame, and
wherein, among the plurality of reflecting surfaces of the second reflection optical system, a final-stage reflecting surface configured to reflect the light toward a second final focusing surface is a second reflecting surface formed on a surface of a second member.

11. The apparatus according to claim 10, wherein the second final focusing surface is a light receiving surface of a second imaging device that receives the light reflected through the second reflection optical system.

12. The apparatus according to claim 10, wherein the second member is supported on the frame.

13. The apparatus according to claim 10, wherein a change of light receiving position of the light at a second predetermined position in a case where a position and orientation of the second reflecting surface with respect to the frame is changed is greater than a change of light receiving position of the light at the second predetermined position in a case where a position and orientation of the reflecting surface, of the second reflection optical system, provided on the frame with respect to the frame is changed.

14. The apparatus according to claim 10, wherein a change of peripheral light quantity of the light at a second predetermined position in a case where a position and orientation of the second reflecting surface with respect to the frame is changed is greater than a change of peripheral light quantity of the light at the second predetermined position in a case where a position and orientation of the reflecting surface, of the second reflection optical system, provided on the frame with respect to the frame is changed.

15. The apparatus according to claim 10, wherein a change of focusing state of the light at a second predetermined position in a case where a position and orientation of the second reflecting surface with respect to the frame is changed is greater than a change of focusing state of the light at the second predetermined position in a case where a position and orientation of the reflecting surface, of the second reflection optical system, provided on the frame with respect to the frame is changed.

16. The apparatus according to claim 10, wherein the second reflection optical system comprises a mirror element.

17. A moving body comprising:
the apparatus according to claim 1; and
a connecting portion configured to connect the apparatus to a base body.

18. The apparatus according to claim 1, wherein the predetermined position is a first final focusing surface.

19. An apparatus comprising:
a first reflection optical system comprising a plurality of reflecting surfaces which reflects a light; and
a frame,
wherein a part of the plurality of reflecting surfaces is a reflecting surface provided on the frame,
wherein, among the plurality of reflecting surfaces, a final-stage reflecting surface configured to reflect the light toward a first final focusing surface is a first reflecting surface formed on a surface of a first member, and
wherein a change of peripheral light quantity of the light at a predetermined position in a case where a position and orientation of the first reflecting surface with respect to the frame is changed is greater than a change of peripheral light quantity of the light at the predetermined position in a case where a position and orientation of the reflecting surface provided on the frame with respect to the frame is changed.

20. A moving body comprising:
the apparatus according to claim 19; and
a connecting portion configured to connect the apparatus to a base body.

21. The apparatus according to claim 19, wherein the predetermined position is a first final focusing surface.

22. An apparatus comprising:
a first reflection optical system comprising a plurality of reflecting surfaces which reflects a light; and
a frame,
wherein a part of the plurality of reflecting surfaces is a reflecting surface provided on the frame,
wherein, among the plurality of reflecting surfaces, a final-stage reflecting surface configured to reflect the light toward a first final focusing surface is a first reflecting surface formed on a surface of a first member, and
wherein a change of focusing state of the light at a predetermined position in a case where a position and orientation of the first reflecting surface with respect to the frame is changed is greater than a change of focusing state of the light at the predetermined position in a case where a position and orientation of the reflecting surface provided on the frame with respect to the frame is changed.

23. A moving body comprising:
the apparatus according to claim 22; and
a connecting portion configured to connect the apparatus to a base body.

24. The apparatus according to claim 22, wherein the predetermined position is a first final focusing surface.

* * * * *